United States Patent [19]
Matsushima

[11] Patent Number: 5,908,390
[45] Date of Patent: Jun. 1, 1999

[54] ULTRASONIC DIAGNOSTIC APPARATUS

[75] Inventor: Tetsuya Matsushima, Kawasaki, Japan

[73] Assignee: Fujitsu Limited, Kawasaki, Japan

[21] Appl. No.: 08/997,396

[22] Filed: Dec. 23, 1997

[30] Foreign Application Priority Data

May 10, 1994 [JP] Japan .................................. 6-125908

[51] Int. Cl.⁶ .................................................. A61B 8/00
[52] U.S. Cl. ........................................... 600/447; 73/626
[58] Field of Search ................................. 600/437, 443,
600/447; 73/625, 626; 367/7, 11, 103, 105

[56] References Cited

U.S. PATENT DOCUMENTS

| Re. 35,148 | 1/1996 | Lizzi et al. | 348/163 |
|---|---|---|---|
| 4,070,905 | 1/1978 | Kossoff | 73/614 |
| 4,254,662 | 3/1981 | Kuroda et al. | 73/626 |
| 4,649,927 | 3/1987 | Fehr et al. | 600/443 |
| 4,790,320 | 12/1988 | Perten et al. | 600/447 |
| 4,813,279 | 3/1989 | Shirasaka | 73/626 |
| 4,886,069 | 12/1989 | O'Donnell | 600/447 |
| 4,893,283 | 1/1990 | Pesque | 600/447 |
| 5,027,821 | 7/1991 | Hirama et al. | 600/447 |
| 5,090,412 | 2/1992 | Shimazaki | 600/443 |
| 5,129,399 | 7/1992 | Hirama | 600/447 |
| 5,421,333 | 6/1995 | Takamizawa et al. | 600/447 |
| 5,462,057 | 10/1995 | Hunt et al. | 600/447 |
| 5,481,917 | 1/1996 | Arimo et al. | 73/621 |
| 5,544,655 | 8/1996 | Daigle | 600/447 |

FOREIGN PATENT DOCUMENTS 6-125908   5/1994   Japan .

OTHER PUBLICATIONS

Trahey, G.E. et al, "Speckle Pattern Correlation W/Lateral Aperture Translation . . ." IEEE TransU FFC vol. 33 No. 35–May 1986 pp. 257–264.

*Primary Examiner*—Francis J. Jaworski
*Attorney, Agent, or Firm*—Staas & Halsey

[57] ABSTRACT

An ultrasonic diagnostic apparatus in which ultrasonic waves are transmitted into the subject, the ultrasonic waves reflected within the subject are received to obtain received signals, and an image is produced in accordance with the received signals thus obtained. Several reception scanning lines are formed in a transmission ultrasonic beam. Several images thus obtained are superimposed on one another or combined together. Using this device deterioration of the picture quality due to multiple reflections or multiple echoes is prevented.

13 Claims, 10 Drawing Sheets

ULTRASONIC DIAGNOSTIC APPARATUS

BACKGROUND OF THE INVENTION

1. Field of the Invention

The present invention relates to an ultrasonic diagnostic apparatus in which ultrasonic waves are transmitted into the subject, the ultrasonic waves reflected within the subject are received to obtain received signals, and an image is produced in accordance with the received signals thus obtained.

2. Description of the Related Art

Hitherto, an ultrasonic diagnostic apparatus has been widely used for the purpose of diagnoses of a disease.

FIG. 13 is a diagram used for the explanation of the function of an ultrasonic diagnostic apparatus.

A plurality of-ultrasonic transducers 21 arranged are put onto a surface of the subject 1 (particularly, the human body). Each of the plurality of ultrasonic transducers 21 has an origin 2a. Transmission and reception of ultrasonic beams are performed sequentially along a plurality of scanning lines 2 extending inside of the subject 1 with the origin 2a as a starting point. Here, it is assumed that transmission and reception of ultrasonic beams are performed sequentially along the scanning lines 2 which sequentially shifts in an X-direction shown in the figure. An ultrasonic beam (transmission ultrasonic beam) is formed along the scanning line 2 in such a manner that high voltage pulses each having the associated controlled delay quantity are applied to the whole or a part of plurality of ultrasonic transducers of the plurality of ultrasonic transducers 21, ultrasonic waves of burst waves each having controlled phase owing to a lag in timing of applying of the high voltage pulses are transmitted from the plurality of ultrasonic transducers, and the ultrasonic waves, which are mutually different in their phase, are superimposed on one another. The transmission ultrasonic beam transmitted to the inside of the subject 1 travels inside the subject 1 while being reflected on the respective points of the inside of the subject 1. Ultrasonic waves reflected on the respective points of the inside of the subject 1 are received by the whole or a part of plurality of ultrasonic transducers of the plurality of ultrasonic transducers 21, and are converted into received signals. Those received signals are relatively delayed by the associated controlled delay quantity, respectively and then added together (beamformed), so that a scanning line signal representative of a reception ultrasonic beam extending inside the subject 1 along the scanning line 2 is formed. With respect to the formation of the reception ultrasonic beam, it will be further described later.

It is to be noted that the scanning line 2 implies a central line of the transmission ultrasonic beam or the reception ultrasonic beam thus formed. Consequently, while the scanning line 2 only exists, when the transmission ultrasonic beam or the reception ultrasonic beam, here the scanning line is made up in mind first, and there is provided such an expression that the transmission ultrasonic beam or the reception ultrasonic beam is formed along the scanning line.

In this manner, the formation of the transmission ultrasonic beam and the reception ultrasonic beam is repeatedly performed along the scanning lines 2 sequentially moved, thereby generating an image signal representative of a frame of image. Such an image signal is finally transmitted, for example, to a display device in which an image based on the image signal thus generated is displayed on a display screen of the display device.

Again referring to FIG. 13, the problems of the earlier developed ultrasonic diagnostic apparatus will be described hereinafter.

It is assumed that a cyst 11 exist inside of the subject 1. The cyst implies a portion, such as internal organs (e.g. gall bladder) and a lesion area (e.g. pustule) inside of which water or pus is gathered, in which ultrasonic waves do not almost reflect. In general, ultrasonic waves undergo a strong reflection on a surface 11a of the cyst 11. In the event that a reflection point A, which involves a strong reflection, exists between the cyst 11 and the origin 2a of the ultrasonic transducers 21 on the scanning line 2 extending vertically in the center of the figure, the transmission ultrasonic beam transmitted from the ultrasonic transducers 21 along the central scanning line 2 partially undergoes a reflection on the reflection point A as shown in FIG. 13 with (a), and components passing through the reflection point A without a reflection on the reflection point A further travels inside of the subject 1, and a part of the components is reflected on the surface 11a of the cyst 11. A part of the ultrasonic waves reflected on the surface 11a of the cyst 11 returns, as shown in FIG. 13 with (b), to the ultrasonic transducers 21, but a part of the reflected ultrasonic waves is again reflected on the reflection point A and further reflected on the surface 11a of the cyst 11 once more and then returns, as shown in FIG. 13 with (c), to the ultrasonic transducers 21. In the ultrasonic diagnostic apparatus, a depth position of the reflection position is detected by means of a measurement of the time required since the transmission ultrasonic beam is transmitted until the reflected ultrasonic wave is received by the ultrasonic transducers 21. Consequently, the reflection position of the ultrasonic wave returned to the ultrasonic transducers via the route shown in FIG. 13 with (c) will be recognized as a point A' coming into the cyst 11 by a distance equal to a distance between the reflection point A and the surface of the cyst 11. As a result, on the image, a false echo image appears inside the cyst 11. This phenomenon is called a multiple reflection or multiple echoes. The multiple reflection or multiple echoes is easy to appear in such a site that a strong reflection organization exists at upper portions close to the ultrasonic transducers 21, and areas lower in the reflection factor spread out at lower portions. This phenomenon causes an image quality to be lowered.

Japanese patent laid open gazette Hei.6-125908 discloses, for the purpose of solving the problems of the multiple reflection or multiple echoes, a technical concept that a reception ultrasonic beam, which extends in a slanting direction with respect to a direction in which a transmission ultrasonic beam extends, is formed, and a reflection ultrasonic wave on an area at which the transmission ultrasonic beam and the reception ultrasonic beam intersects each other s received. According to Japanese patent laid open gazette Hei.6-125908, there is provided such an explanation that as if a strong reflection point (corresponding to the reflection point A shown in FIG. 13) exists only in the direction of the transmission ultrasonic beam as shown in FIG. 13. Indeed, however, it happens that a strong reflection point exists also in the direction of the reception ultrasonic beam. Therefore, in such a case, the slanting reception of the ultrasonic beam cannot solve the problems of the multiple reflection or multiple echoes. The slanting reception of the ultrasonic beam will serve to weaken an intensity of the normal reflection ultrasonic wave, thereby lowering S/N of the received signals, in addition to the problems of the multiple reflection or multiple echoes. Also in this respect, the problem as to lowering of the image quality remains.

SUMMARY OF THE INVENTION

In view of the foregoing, it is therefore an object of the present invention to provide an ultrasonic diagnostic apparatus involving no lowering of the image quality due to the multiple reflection or multiple echoes.

To achieve the above-mentioned object, according to the present invention, there is provided a first ultrasonic diagnostic apparatus comprising:

(1_1) an ultrasonic probe having an array of plurality of ultrasonic transducers for transmitting ultrasonic waves into a subject upon putting the array to the subject and for receiving ultrasonic waves reflected within the subject and returned;

(1_2) a transmit-receive unit for driving the ultrasonic transducers so as to sequentially form transmission ultrasonic beams travelling along a plurality of transmission scanning lines extending into the subject with an origin on the ultrasonic transducers as a starting point, and for receiving with the ultrasonic transducers ultrasonic waves reflected within the subject and returned to produce received signals associated with the ultrasonic transducers;

(1_3) a beamformer unit having a plurality of beamformers each for relatively delaying a plurality of received signals associated with a plurality of ultrasonic transducers, respectively, produced in said transmit-receive unit, and adding the received signals thus delayed to each other, each of said plurality of beamformers producing a plurality of scanning line signals representative of a plurality of reception ultrasonic beams along a plurality of reception scanning lines extending within a transmission ultrasonic beam travelling a transmission scanning line with an origin on the ultrasonic transducers as a starting point;

(1_4) an output image generating unit for generating an output image signal representative of an output image in which a plurality of images are combined in accordance with the scanning line signals produced in said beamformer unit while said transmit-receive unit forms the transmission ultrasonic beams travelling along said plurality of transmission scanning lines; and (1_5) an image output unit for outputting an output image based on the output image signal generated in said output image generating unit.

It is possible to obtain a plurality of sheets of images, when an operation of obtaining a plurality of reception ultrasonic beams along a plurality of reception scanning lines extending within a transmission ultrasonic beam is performed on a frame of transmission ultrasonic beams. Under the situation that false echo images appear owing to multiple reflection or multiple echoes, however, it often happens that false echo images appear on any images even if they are mutually different in intensity. But, false echo images appear at mutually different sites on the respective images. In view of the foregoing, the images are synthesized in such a manner that the associated pixels are superimposed on one another, so that information as to the proper reflection point is enhanced through a superposition, while false echo images are spread into a relatively wide area on the image and thus becomes Inconspicuous.

The first ultrasonic diagnostic apparatus of the present invention has been made on the basis of the above-mentioned principle. According to the first ultrasonic diagnostic apparatus, it is possible to obtain a high picture quality of image in which false echo images are inconspicuous.

In the first ultrasonic diagnostic apparatus as mentioned above, it is preferable that said transmit-receive unit (1_2) drives a plurality of ultrasonic transducers arranged on said ultrasonic probe so as to sequentially form transmission ultrasonic beams each travelling along an associated one of transmission scanning lines in which their origins sequentially shift along said plurality of ultrasonic transducers, and each of said plurality of beamformers of said beamformer unit (1_3) produces a plurality of scanning line signals representative of a plurality of reception ultrasonic beams along a plurality of reception scanning lines extending in mutually different directions within a transmission ultrasonic beam travelling a transmission scanning line.

The above-mentioned type of ultrasonic diagnostic apparatus is suitable for a so-called linear scanning in which as explained referring to FIG. 13, a transmission scanning line moves in parallel along an arrangement direction of the ultrasonic transducers.

In the first ultrasonic diagnostic apparatus as mentioned above, it is preferable that said transmit-receive unit permits an optional selection of a number of ultrasonic transducers to be driven for a formation of a transmission ultrasonic beam, and each of said plurality of beamformers of said beamformer unit produces a plurality of scanning line signals representative of a plurality of reception ultrasonic beams along a plurality of reception scanning lines, according to a number of ultrasonic transducers to be driven by said transmit-receive unit for a formation of a transmission ultrasonic beam travelling along a transmission scanning line, arranged in such a manner that when the number is large, an angle between the reception scanning lines is narrow, and when the number is small, an angle between the reception scanning lines is wide.

The use of a large number of ultrasonic transducers to be driven for a formation of a transmission ultrasonic beam serves to narrow a beam width. On the other hand, the use of a small number of ultrasonic transducers to be driven for a formation of a transmission ultrasonic beam serves to spread a beam width. It is more advantageous in order to weaken false echo images that an angle between reception scanning line-to-line is wide or large. However, when the reception scanning lines are out of the beam width, it would be difficult to receive the reflected ultrasonic waves with a sufficient S/N ratio.

For these reasons, there is provided such a control that a plurality of reception scanning lines is, according to a number of ultrasonic transducers to be driven for a formation of a transmission ultrasonic beam travelling along a transmission scanning line, arranged in such a manner that when the number is large, an angle between the reception scanning lines is narrow, and when the number is small, an angle between the reception scanning lines is wide. In this manner, it is possible to contribute to a reduction of false echo images as much as possible in accordance with the condition of the ultrasonic transmission.

In the first ultrasonic diagnostic apparatus as mentioned above, it is preferable that said transmit-receive unit (1_2) drives the ultrasonic transducers so as to sequentially form transmission ultrasonic beams each travelling along an associated one of transmission scanning lines in which their scanning directions sequentially change, and each of said plurality of beamformers of said beamformer unit (1_3) produces a plurality of scanning line signals representative of a plurality of reception ultrasonic beams along a plurality of reception scanning lines extending within a transmission ultrasonic beam travelling along a transmission scanning line with mutually different origins on the ultrasonic transducers as starting points.

The above-mentioned type of ultrasonic diagnostic apparatus is suitable for a so-called sector scanning in which a transmission scanning line alters in sequentially different directions as a sector.

In the first ultrasonic diagnostic apparatus as mentioned above, it is preferable that said transmit-receive unit permits an optional selection of a number of ultrasonic transducers to be driven for a formation of a transmission ultrasonic beam, and > each of said plurality of beamformers of said beamformer unit produces a plurality of scanning line signals representative of a plurality of reception ultrasonic beams along a plurality of reception scanning lines, according to a number of ultrasonic transducers to be driven by said transmit-receive unit for a formation of a transmission ultrasonic beam travelling along a transmission scanning line, having mutually different origins, arranged in such a manner that when the number is large, a distance between the origins is short, and when the number is small, a distance between the origins is long.

It is more advantageous in order to weaken false echo images that a distance between reception scanning line-to-line is wide or large. The adoption of the above-mentioned type of ultrasonic diagnostic apparatus makes it possible to contribute to a reduction of false echo images as much as possible in accordance with the condition of the ultrasonic transmission.

Further, in the first ultrasonic diagnostic apparatus as mentioned above, it is preferable that said transmit-receive unit permits an optional selection of a number of ultrasonic transducers to be driven for a formation of a transmission ultrasonic beam, and said transmit-receive unit drives ultrasonic transducers, to form a transmission ultrasonic beam travelling along a transmission scanning line, in accordance with a distance between an origin on the ultrasonic transducers of the transmission scanning line and a focus position of the transmission ultrasonic beam in such a manner that when the distance is long, a large number of ultrasonic transducers is driven, and when the distance is short, a small number of ultrasonic transducers is driven.

Generally, in many cases, it happens that multiple reflection and multiple echoes occur at shallow sites of the subject which are involved in a high reception level of reflection ultrasonic waves. Consequently, in the event that the above-mentioned distance is short, or the focus is shallow, more specifically, in the event that the site of interest is a shallow site and it is intended to obtain the shallow site of image, this involves no problem, even if the the reception level goes down, since the reception level is originally high. In such a case, it will be rather more advantageous that a number of ultrasonic transducers to be driven for a formation of a transmission ultrasonic beam is reduced to expand the beam wide, and angles or intervals between the reception scanning line-to-line are expanded.

In the event that the above-mentioned distance is large, or the focus is deep, there is a need to form a large power of transmission ultrasonic beam to compensate for the attenuation of ultrasonic waves within the subject, and in order to form the transmission ultrasonic beam, a large number of ultrasonic transducers are driven. However, this hardly involves problems of multiple reflection or multiple echoes, since the reception level is originally low in deep sites of the subject as mentioned above.

Furthermore, in the first ultrasonic diagnostic apparatus as mentioned above, it is preferable that said ultrasonic diagnostic apparatus further comprises a handler for instructing directly or indirectly a number of ultrasonic transducers to be driven to form a transmission ultrasonic beam.

There will exist the subjects in one of which false echo images caused by multiple reflection or multiple echoes are easy to appear, and in another of which false echo images caused by multiple reflection or multiple echoes are hard to appear, even in comparison of the same depth of region of interest between those subjects. In order to reduce an influence of multiple reflection or multiple echoes on images, it is more advantageous that a transmission ultrasonic beam is spread to expand angles or intervals between reception scanning lines. Thus, a relatively small number of ultrasonic transducers are driven to form a transmission ultrasonic beam. On the other hand, in order to improve a resolution of images, it is more advantageous that a relatively large number of ultrasonic transducers are driven to form a transmission ultrasonic beam having a fine beam diameter. As seen from the above description, a reduction of false echo images due to multiple reflection or multiple echoes and an improvement of resolution are contrary to each other. Then, the use of the handler as mentioned above makes it possible to set up a desired condition for an operator in such a manner that when the subject in which false echo images are easy to appear is an object, false echo images are reduced at the sacrifice of resolution by some extent, and when the subject in which false echo images are hard to appear is an object, a high resolution of image is formed.

Incidentally, while it is acceptable that the handier is of a type in which a number of ultrasonic transducers to be driven is directly instructed, it is also acceptable that the handler is of a type in which a number of ultrasonic transducers to be driven is indirectly instructed through indicating, for example, a resolution and a transmission ultrasonic power.

Still further, in the first ultrasonic diagnostic apparatus as mentioned above, it is preferable that said output image generating unit (1_4) performs an operation including an arithmetic mean operation, a geometric mean operation or a square mean operation for pixel values of associated pixels of the plurality of images to generate the output image signal representative of the output image.

In order to superimpose the associated pixels on one another of a plurality of images, an average operation is performed. It is to be noted, however, that this average operation is not restricted to a specific average operation, and it is acceptable that the average operation is an arithmetic mean operation, a geometric mean operation or a square mean operation.

To achieve the above-mentioned object, according to the present invention, there is provided a second ultrasonic diagnostic apparatus comprising:

(2_1) an ultrasonic probe having an array of plurality of of ultrasonic transducers for transmitting ultrasonic waves into a subject upon putting the array to the subject and for receiving ultrasonic waves reflected within the subject and returned;

(2_2) a transmit-receive unit for driving the ultrasonic transducers so as to sequentially form transmission ultrasonic beams travelling along a plurality of transmission scanning lines extending into the subject with an origin on the ultrasonic transducers as a starting point, and for receiving with the ultrasonic transducers ultrasonic waves reflected within the subject and returned to produce received signals associated with the ultrasonic transducers;

(2_3) a beamformer unit having a beamformer for relatively delaying a plurality of received signals associated with a plurality of ultrasonic transducers, respectively, produced in said transmit-receive unit, and adding the received signals thus delayed to each other, said beamformer producing a scanning line signal representative of a reception ultrasonic beam along a reception scanning line extending within a transmission ultrasonic beam travelling a transmission scanning line with an origin on the ultrasonic transducers as a starting point;

(2_4) an output image generating unit for generating an output image signal representative of an output image in accordance with the scanning line signals produced in said beamformer unit while said transmit-receive unit forms the transmission ultrasonic beams travelling along said plurality of transmission scanning lines; and (2_5) an image output unit for outputting an output image based on the output image signal generated in said output image generating unit, wherein said beamformer unit (2_3) produces scanning line signals each representative of a reception ultrasonic beam along a reception scanning line alternately or circulatingly different on a sequentially changed frame, the reception scanning line extending within a transmission ultrasonic beam travelling a same transmission scanning line in the sequentially changed frame, where a process of going once through a formation of the plurality of transmission ultrasonic beams travelling the plurality transmission scanning lines is expressed by one frame.

According to the first ultrasonic diagnostic apparatus of the present invention, a plurality of reception ultrasonic beams along a plurality of reception scanning lines extending within a transmission ultrasonic beam are simultaneously produced, and a plurality of images, which are obtained on the basis of the reception ultrasonic beams thus produced, are combined and then outputted in form of a sheet of image. In this case, there is a need to provide a plurality of beamformers, and thus there is a tendency to enlarge a circuit scale as compared with the conventional ultrasonic diagnostic apparatus. On the other hand, according to the second ultrasonic diagnostic apparatus of the present invention, a plurality of reception ultrasonic beams along a plurality of reception scanning lines extending within the same transmission ultrasonic beam in a plurality of frames are sequentially produced for each frame, and images are sequentially outputted for each frame. Then, false echo images appear at different sites for each frame. This looks like false echo images weakened owing to after-image effect of person's eyes. In this case, in a similar fashion to that of the conventional ultrasonic diagnostic apparatus, it is sufficient for each frame to form only a reception ultrasonic beams in association with a transmission ultrasonic beam, and thus the same degree of circuit scale as the conventional one can be used.

In the second ultrasonic diagnostic apparatus as mentioned above, it is preferable that said transmit-receive unit (2_2) drives, in each frame, a plurality of ultrasonic transducers arranged on said ultrasonic probe so as to sequentially form transmission ultrasonic beams each travelling along an associated one of transmission scanning lines in which their origins sequentially shift along said plurality of ultrasonic transducers, and said beamformer of said beamformer unit (2_3) produces scanning line signals each representative of a reception ultrasonic beam along a reception scanning line extending in a direction alternately or circulatingly different on a sequentially changed frame within a transmission ultrasonic beam travelling a same transmission scanning line in a plurality of frames.

This type of ultrasonic diagnostic apparatus is suitable for a so-called linear scanning in which as explained referring to FIG. 13, a transmission scanning line moves in parallel along the arrangement direction of the ultrasonic transducers.

Further, in the second ultrasonic diagnostic apparatus as mentioned above, it is preferable that said transmit-receive unit (2_2) drives, in each frame, the ultrasonic transducers so as to sequentially form transmission ultrasonic beams each travelling along an associated one of transmission scanning lines in which their scanning directions sequentially change, and said beamformer of said beamformer unit (2_3) produces scanning line signals each representative of a reception ultrasonic beam along a reception scanning line extending within a transmission ultrasonic beam travelling along a same transmission scanning line in a plurality of frames with alternately or circulatingly different origins on a sequentially changed frame on the ultrasonic transducers as starting points.

This type of ultrasonic diagnostic apparatus is suitable for a so-called sector scanning in which a transmission scanning line alters sequentially in different directions as a sector.

DESCRIPTION OF THE PREFERRED EMBODIMENTS

Hereinafter, there will be described embodiments of the present invention.

Figure 1:
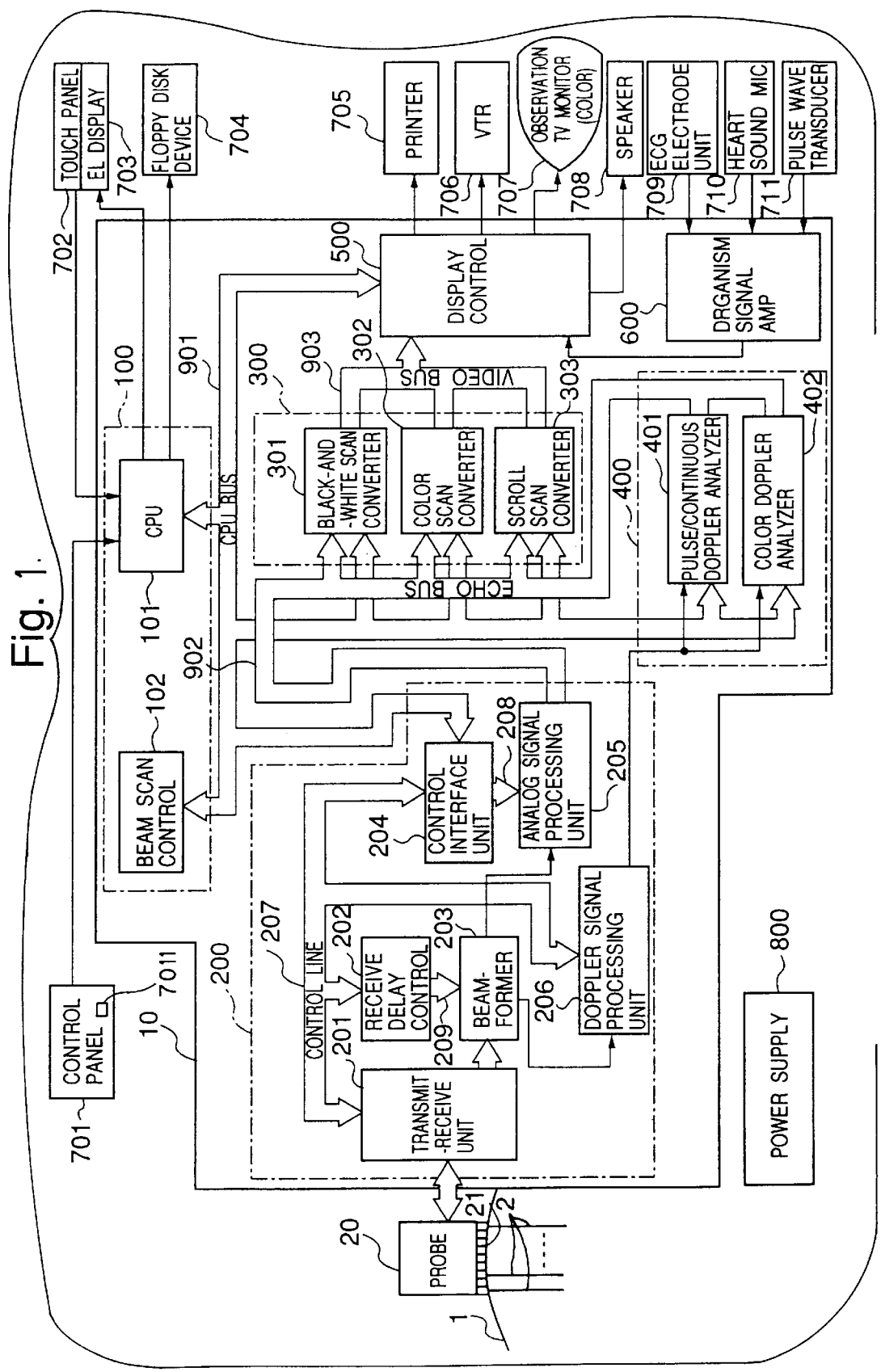
FIG. 1 is a block diagram of an ultrasonic diagnostic apparatus according to an embodiment of the present invention.

FIG. 1 is a block diagram of an ultrasonic diagnostic apparatus according to an embodiment of the present invention. There will be described an outline of the ultrasonic diagnostic apparatus referring to this block diagram.

First, there will be described a structure of the ultrasonic diagnostic apparatus hereinafter.

A main frame 10 of the ultrasonic diagnostic apparatus comprises a control unit 100, an analog processing unit 200, a digital scan converter unit 300, a Doppler processing unit 400, a display control unit 500 and an organism signal amplifier unit 600. The control unit 100 comprises a CPU 101 and a beam scan control unit 102. Connected to the CPU 101 are a control panel 701, a unitary body of touch panel 702 and EL display 703, and a floppy disk device 704.

The analog processing unit 200 comprises a transmit-receive unit 201, a receive delay control unit 202, a beamformer unit 203, a control interface unit 204, an analog signal processing unit 205 and a Doppler signal processing unit 206. The control interface unit 204, the transmit-receive unit 201, the receive delay control unit 202, and the Doppler signal processing unit 206 are connected to one another via a control line 207. Further, the control interface unit 204 is connected via a control line 208 to the analog signal processing unit 205. The receive delay control unit 202 and the beamformer unit 203 are connected to one another via a control line 209. Detachably connected to the transmit-receive unit 201, which constitutes the analog processing unit 200, is an ultrasonic probe 20, by the maximum, four pieces of ultrasonic probe 20.

The digital scan converter unit 300 comprises a black-and-white scan converter 301, a color scan converter 302 and a scroll scan converter 303.

The Doppler processing unit 400 comprises a pulse/continuous wave Doppler analyzing unit 401 and a color Doppler analyzing unit 402.

The display control unit 500 is illustrated with a single block. Connected to the display control unit 500 are a printer 705, a VTR (Video Tape Recorder) 706, an observation television monitor 707 and a speaker 708.

The organism signal amplifier unit 600 is also illustrated with a single block. Connected to the organism signal amplifier unit 600 are an ECG electrode unit 709, a heart sound microphone 710 and a pulse wave transducer 711.

The ultrasonic diagnostic apparatus further comprises a power source unit 800 connected to a commercial power supply for supplying necessary power to individual sections of the ultrasonic diagnostic apparatus.

The main frame 10 has a CPU bus 901 for connecting the CPU 101 and the beam scan control unit 102, which constitute the control unit 100, the control interface unit 204, which constitutes the analog processing unit 200, the black-and-white scan converter 301, the color scan converter 302 and the scroll scan converter 303, which constitute the digital scan converter unit 300, the pulse/continuous wave Doppler analyzing unit 401 and the color Doppler analyzing unit 402, which constitute the Doppler processing unit 400, and the display control unit 500 with each other. The main frame 10 further has an echo bus 902 for supplying image data generated from the analog signal processing unit 205, which constitutes the analog processing unit 200, to the digital scan converter unit 300. With respect to data generated from the pulse/continuous wave Doppler analyzing unit 401 and the color Doppler analyzing unit 402, which constitute the Doppler processing unit 400, such data are also supplied through the echo bus 902 to the digital scan converter unit 300. The main frame 10 further has a video bus 903 for transmitting a video signal generated from anyone of the black-and-white scan converter 301, the color scan converter 302 and the scroll scan converter 303, which constitute the digital scan converter unit 300, to the display control unit 500.

The control panel 701 consists of a keyboard, etc. having a number of keys arranged. When the control panel 701 is operated, operation information is detected by the CPU 101, so that an instruction associated with the operation information is transmitted to the beam scan control unit 102, the control interface unit 204, the digital scan converter unit 300, or the display control unit 500 in accordance with the the instruction. The control panel 701 further has a handler 7011 for controlling a balance of the extent of a transmission aperture for defining a transmission ultrasonic beam and the resolution of an image. Details of the handler 7011 will be described later.

The EL display unit 703 has a liquid-crystal display screen. The CPU 101 serves as an EL line drawing generating unit for generating an EL line drawing to be displayed on the liquid-crystal display screen of the EL display unit 703, too. The EL line drawing generated in the CPU 101 is displayed on the liquid-crystal display screen of the EL display unit 703. The liquid-crystal display screen of the EL display unit 703 is provided with the touch panel 702. When an operator touches the touch panel 702 by his fingers, position information representative of the associated touched position on the touch panel 702 is transmitted to the CPU 101. The touch panel 702 and the EL display unit 703 are arranged, so that various types of instructions to the ultrasonic diagnostic apparatus can be readily inputted, in such a manner that, for instance, when it is instructed to the ultrasonic diagnostic apparatus through an operation of the control panel 701 that a parameter as to a certain mode is set up for the ultrasonic diagnostic apparatus, the CPU 101 causes the EL display unit 703 to display a table of a number of parameters to be set up for the selected mode, so that an operator touches the touch panel 702 by his fingers to set up a desired parameter.

The floppy disk device 704 is a device onto which a floppy disk (not illustrated) is detachably loaded, wherein the loaded floppy disk is accessed. The CPU 101 causes instructions made by an operator through an operation of the control panel 701 and the touch panel 702 to be written into the floppy disk loaded onto the floppy disk device 704. When the power supply of the ultrasonic diagnostic apparatus is turned on, or when a reset to the initial state is instructed through an operation of the control panel 701, various types of instruction information, which are stored in the floppy disk device 704 loaded onto the floppy disk device 704, are read out therefrom and fed to the CPU 101 so that the CPU 101 sets up the individual sections of the ultrasonic diagnostic apparatus to the initial state in accordance with the instruction information. There will exist a number of parameters to be set up by an operator through an operation of the control panel 701 and the touch panel 702, which are needed when the ultrasonic diagnostic apparatus is operated. It will be very troublesome for the operator to do over again a setting of such a number of parameters, for example, whenever the power supply turns on. For this reason, parameters of the initial state, etc. are written in the floppy disk beforehand, and when the power supply of the ultrasonic diagnostic apparatus is turned on, or when a reset to the initial state is instructed, the parameters and the like stored in the floppy disk are read out therefrom to set up the individual sections of the ultrasonic diagnostic apparatus in accordance with the parameters and the like thus read, thereby contributing to an enhancement of efficiency in setting the parameters and the like.

The CPU 101, which constitutes the control unit 100, mainly serves as a man-machine interface, as mentioned above. On the other hand, the beam scan control unit 102, which also constitutes the control unit 100, is mainly in charge of the control, for example, of timing of transmit and receive of ultrasonic waves in the ultrasonic diagnostic apparatus, which needs an operational ability on a real-time basis. According to this type of ultrasonic diagnostic apparatus, when transmit and receive of ultrasonic waves are performed, control signals of controlling the individual sections constituting the analog processing unit 200 are transmitted from the beam scan control unit 102 through the CPU bus 901 to the control interface unit 204, so that the control interface unit 204 controls via a control line 207 the transmit-receive unit 201, the receive delay control unit 202, and the Doppler signal processing unit 206. Further, the control interface unit 204 controls via a control line 208 the analog signal processing unit 205. The receive delay control unit 202 controls the beamformer unit 203 via the control line 209 under control of the control interface unit 204.

The transmit-receive unit 201 is coupled to the ultrasonic probe 20. With respect to the ultrasonic probe, there exist, for example, a linear scan type of ultrasonic probe, a convex scan type of ultrasonic probe, and a sector scan type of ultrasonic probe. As an especial type of ultrasonic probe, there is a type of ultrasonic probe to be inserted into a body cavity. Further, with respect to those various types of ultrasonic probes, there exist many types of ultrasonic probes, which may be classified in accordance with a difference in frequency of the ultrasonic waves to be used. In order that a ultrasonic probe is loaded on the main frame 10, a connector (not illustrated) is used. The main frame 10 end is provided with four connectors adapted to be connected to ultrasonic probes. Thus, as mentioned above, it is possible to simultaneously load onto the connectors the ultrasonic probes, by the maximum 4 pieces, of the above-mentioned various types of ultrasonic probes. When a ultrasonic probe is loaded on the main frame 10, the main frame 10 may identify information as to which type of ultrasonic probe is loaded. Such information is transmitted via the control line 207, the control interface unit 204 and the CPU bus 901 to the CPU 101. On the other hand, the control panel 701 issues an instruction as to which ultrasonic probe is used among the ultrasonic probes connected to four connectors of the main frame 10 end, when the ultrasonic diagnostic apparatus is used. Such an instruction is transmitted via the CPU bus 901, the control interface unit 204 and the control line 207 to the transmit-receive unit 201. Upon receipt of the instruction, the transmit-receive unit 201 transmits high voltage pulses (which will be described latter) to the ultrasonic probe 20 thus indicated to generate ultrasonic waves, and receives signals which are received by the ultrasonic probe 20. Here, it is assumed that the ultrasonic probe 20, as shown in FIG. 1 by one, is selected for transmission and reception of ultrasonic waves.

On the tip of the ultrasonic probe 20, there are arranged a plurality of ultrasonic transducers 21, which are put to a surface of the subject 1 (particularly human body) to transmit and receive ultrasonic waves. In this condition, high voltage pulses for transmission and reception of ultrasonic waves are applied from the transmit-receive unit 201 to the plurality of ultrasonic transducers 21, respectively. The high voltage pulses applied to the plurality of ultrasonic transducers 21 are controlled in a relative time difference under control of the control interface unit 204. Ultrasonic pulse beams are transmitted from the plurality of ultrasonic transducers 21 along anyone of a plurality of scan lines 2 extending to the inside of the subject 1 in such a manner that the focus of the ultrasonic pulse beams is adjusted on a predetermined depth position inside of the subject 1 in accordance with a control of the relative time difference as to the application of the high voltage pulses to the plurality of ultrasonic transducers 21. The ultrasonic pulse beam is reflected on the individual points on the one scan line during travelling inside the subject 1, and returns to the ultrasonic probe 20 so that the reflected ultrasonic waves are received by the plurality of ultrasonic transducers 21. A plurality of received signals, which are obtained through receiving the reflected ultrasonic waves, are supplied to the transmit-receive unit 201 so as to be amplified by a plurality of preamplifiers (not illustrated) of the transmit-receive unit 201, and then fed to the beamformer unit 203. The beamformer unit 203 is provided with an analog delay line (not illustrated) having a number of center taps. The center taps are selected in operation to receive the plurality of received signals transmitted from the transmit-receive unit 201 in accordance with a control of the receive delay control unit 202, whereby the plurality of received signals are relatively delayed and added together in current. Controlling a relative delay pattern as to the plurality of received signals may emphasize the reflected ultrasonic waves in the direction along the scan line identical with the scan line associated with the time of the ultrasonic wave transmission, and forms a so-called reception ultrasonic beam in which the focus of the ultrasonic pulse beams is adjusted on a predetermined depth position inside of the subject 1. Since ultrasonic waves travel slowly inside of the subject 1 as compared with a rate of the signal processing, it is possible to implement a so-called dynamic focus in which the focus is sequentially shifted to the deeper position inside of the subject while receiving the ultrasonic waves along one scan line. In this case, the center taps of the analog delay line are switchingly selected by the receive delay control unit 202 in response to the signals sequentially obtained by the ultrasonic transducers, even during once receiving associated with once transmitting the ultrasonic pulse beam. The structure of the beamformer unit 203 will be further described later.

According to the above-mentioned explanation, the high voltage pulses are applied to the ultrasonic transducers 21 to transmit the ultrasonic pulse beam. In this case, as mentioned above, since ultrasonic waves travel slowly inside of the subject as compared with a rate of the signal processing, it is possible, through measuring time from a starting time of application of the high voltage pulses to the ultrasonic transducers 21 to a time of receive of the reflected ultrasonic waves by the ultrasonic transducers 21, to identify the signal obtained at that time concerned with receiving of the reflected ultrasonic waves with respect to the association of the reflected ultrasonic wave with the depth position inside of the subject. That is, the feature that the ultrasonic wave to be transmitted is shaped as a pulse may provide a resolution with respect to the depth direction of the subject. Usually, in this manner, the high voltage pulses are applied to the ultrasonic transducers 21. In the special case, however, on condition that it is permitted to have no resolution with respect to the depth direction of the subject, it happens that a continuously repetitive high voltage pulse train signal is applied to the ultrasonic transducers 21 to transmit ultrasonic beams in the form of a continuous wave.

Also hereinafter, the ultrasonic diagnostic apparatus will be explained on the assumption that a pulse-like shaped ultrasonic beam is transmitted, except for a case that when the pulse/continuous wave Doppler analyzing unit 401, which constitutes the Doppler processing unit 400, is explained, the continuous wave is referred to.

In the manner as mentioned above, the transmit-receive unit 201 and the beamformer unit 203 sequentially repeatedly perform transmission and reception of the ultrasonic pulse beams along each of a plurality of scanning lines 2 inside of the subject 1, so that signals thus generated, each representative of the reception ultrasonic beam along each of the scanning lines, are sequentially fed to the analog signal processing unit 205. In the analog signal processing unit 205, the received analog signals are subjected to logarithmic compression, detection, and filtering processings, etc. according to a designation issued from the control panel 701 as to which depth area inside of the subject 1 an image is to be displayed concerned with, that is, a designation as to whether it is sufficient that an image concerned with only the shallow area inside of the subject 1 is displayed, or a designation as to what degree of depth area an image is to be displayed concerned with. The analog signals thus processed are converted into digital of image data by an A/D converter unit. Image data outputted from the analog signal processing unit 205 are fed via the echo bus 902 to the black-and-white scan converter 301, which constitutes the digital scan converter unit 300. The black-and-white scan converter 301 converts the received image data to a video signal for a display, and then transmits the video signal for a display via the video bus 903 to the display control unit 500. The display control unit 500 causes the observation television monitor 707 to display a B-mode image caused by the ultrasonic reflection intensity distribution on the tomographic plane of the subject defined by a plurality of scan lines 2. At that time, if necessary, it is possible to display patient's names, photographing date, photographing conditions, etc. superposing on the B-mode image. As the B-mode image, it is possible to display a dynamic image representative of the state in which the inside of the subject 1 moves, a static image at a certain time, or an image in a certain phase of a movement of the heart of a human body, which is synchronized with the movement of the heart, in accordance with a synchronizing signal generated from the organism signal amplifier unit 600.

Connected to the organism signal amplifier unit 600 are the ECG electrode unit 709, the heart sound microphone 710 and the pulse wave transducer 711. The organism signal amplifier unit 600 generates the synchronizing signal in accordance with any one of these elements or a plurality of sensors, and transmits the same to the display control unit 500.

Connected to the display control unit 500 are the observation television monitor 707, and the printer 705 and the VTR (Video Tape Recorder) 706 as well. The display control unit 500 outputs images displayed on the observation television monitor 707 to the printer 705 or the VTR 706 in accordance with an instruction from an operator.

Again, an explanation will be continued from the analog processing unit 200.

When it is desired to know time variation of information as to the reflection of ultrasonic waves on a certain one scan line extending to the inside of the subject, the ultrasonic waves are repeatedly transmitted and received along a certain one scan line of interest, and data representative of the received beam of the subject along the one scan line is transmitted via the echo bus 902 to the scroll scan converter 303. The scroll scan converter 303 generates a video signal representative of an image (an M-mode image) in which the ultrasonic reflection intensity distribution in the depth direction of the subject along the one scan line is given in the longitudinal direction, and the lateral axis consists of a time axis, wherein the image is scrolled in the time axis direction. The video signal thus generated is fed via the video bus 903 to the display control unit 500, so that an image based on the video signal is displayed, for example, on the observation television monitor 707.

The display control unit 500 has a function such that the video signal representative of the B-mode image transmitted from the black-and-white scan converter 301 and the video signal representative of the M-mode image transmitted from the scroll scan converter 303 are arranged side by side, and in addition a function such that a color mode image, which will be described later, is superposed on the B-mode image. The observation television monitor 707 is adapted to display thereon a plurality of images being arranged side by side in accordance with an instruction from an operator, alternatively display a plurality of images being superposed.

Again, returning to the explanation of the analog processing unit 200, the Doppler signal processing unit 206, which constitutes the analog processing unit 200, serves as a structure element for determining a blood flow distribution of the inside of the subject, or a blood flow distribution at a certain point or on a certain one scan line. In the Doppler signal processing unit 206, a signal representative of the reception ultrasonic beam generated in the beamformer unit 203 is subjected to a so-called quadrature detection and in addition converted into digital data through an A/D conversion. The data, which has been subjected to the quadrature detection, is outputted from the Doppler signal processing unit 206, is fed to the Doppler processing unit 400. The Doppler processing unit 400 comprises the pulse/continuous wave Doppler analyzing unit 401 and the color Doppler analyzing unit 402. Here, it is assumed that the data outputted from the Doppler signal processing unit 206 is fed to the color Doppler analyzing unit 402. The color Doppler analyzing unit 402 determines data representative of a blood flow distribution on an area of interest (ROI) on the B-mode image, which is designated by an operator, by an auto-correlation operation based on data obtained through performing, for example, eight times of ultrasonic transmit and receive on each scan line. The data representative of a blood flow distribution on the area (ROI) is fed via the echo bus 902 to the color scan converter 302. The color scan converter 302 converts the data representative of a blood flow distribution on the area (ROI) into a video signal suitable for a display, and transmits the video signal to the display control unit 500. The display control unit 500 superimposes a color mode image, in which a blood in a direction coming near the ultrasonic probe 20, a blood in a direction going away from the ultrasonic probe 20, and a blood velocity are represented by, for example, red, blue and luminance, respectively, on the area (ROI) of the B-mode image transmitted from the black-and-white scan converter 301, and causes those images to be displayed on the observation television monitor 707. Thus, it is possible to grasp the outline of the blood flow distribution on the area (ROI).

When an operator inputs a requirement to observe in detail a blood at a certain one point on the area (ROI) or on a certain one scan line, then the transmit-receive unit 201 repeats a lot of number of times of transmit and receive of the ultrasonic waves in a direction along a one scan line passing through the one point, or a direction along the one scan line of interest. And data, which is generated in the the Doppler signal processing unit 206 in accordance with the signals thus obtained by the repetitive transmit and receive of the ultrasonic waves, is fed to the pulse/continuous wave Doppler analyzing unit 401 constituting the Doppler processing unit 400. When it is interested in the a blood flow at a certain point, a pulse-like shaped ultrasonic beam is transmitted into the subject. On the other hand, when it is desired to obtain blood information excellent in S/N ratio, permitting that blood information on a certain one scan line is averaged, a ultrasonic beam is transmitted in the form of a continuous wave into the subject.

The pulse/continuous wave Doppler analyzing unit 401 performs an FFT (Fast Fourier Transform) operation based on data obtained through carrying out a lot of number of times of transmit and receive of the ultrasonic waves on a certain one point, or a certain one scan line to obtain blood flow information on the one point, or blood flow information averaged on the one scan line. Data representative of the blood flow information obtained in the pulse/continuous wave Doppler analyzing unit 401 is fed via the echo bus 902 to the scroll scan converter 303. The scroll scan converter 303 generates a video signal representative of an image in which the longitudinal axis and the lateral axis denote a blood flow velocity and a time axis, respectively, and the image may scroll in a direction of the time axis. This video signal is fed via the video bus 903 to the display control unit 500. The display control unit 500 causes the video signal to be displayed on the observation television monitor 707 together with the B-mode image transmitted from the black-and-white scan converter 301, for example.

Figure 2:
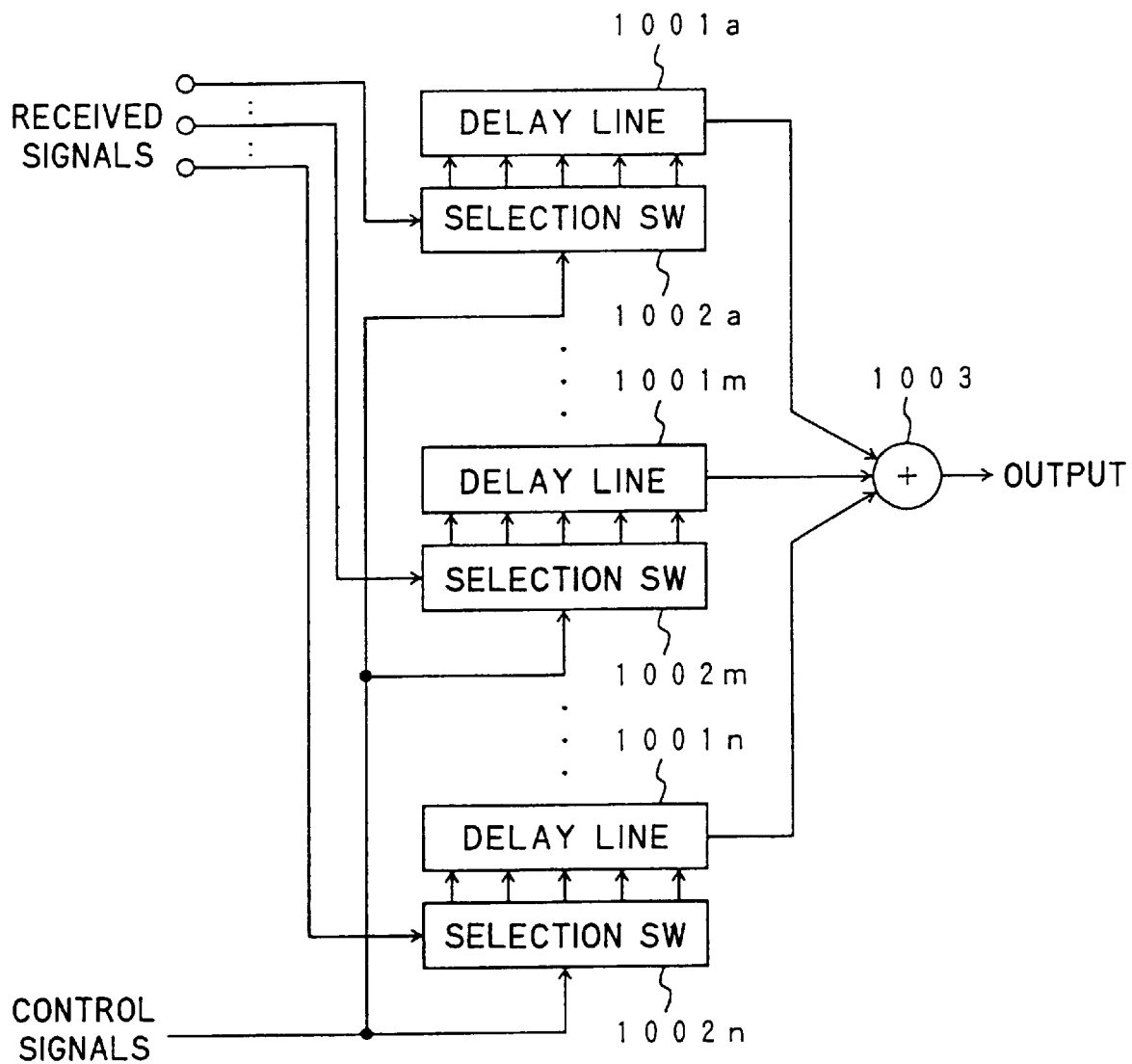
FIG. 2 is a diagram used for the explanation of the principle of a way of the formation of a reception ultrasonic beam in a beamformer unit.

FIG. 2 is a diagram used for the explanation of the principle of a way of the formation of a reception ultrasonic beam in a beamformer unit.

Here, for the purpose of simplification of the explanation, it is assumed that the respective pairs of delay lines 1001a,..., 1001m,..., and 1001n each having a plurality of taps, and selection switches 1002a,..., 1002m,..., and 1002n each for selecting an input route of a received signal to a delay line according to a control signal are provided for the associated ultrasonic transducers 21 (cf. FIG. 1), respectively. Each of the selection switches 1002a,..., 1002m, and 1002n receives a one received signal obtained in an associated one ultrasonic transducer 21. In each of the selection switches 1002a,..., 1002m,..., and 1002n, the input received signal is fed to an associated delay line through a tap according to a control signal, of a plurality of taps of the delay line. In each of the delay lines 1001a,..., 1001m,..., and 1001n, the received signal is delayed by a delay time according to the tap to which the received signal is fed, and the received signal thus delayed is applied to an adder 1003. The adder 1003 adds the received signals, which are simultaneously applied thereto, and outputs a scanning line signal representative of a received ultrasonic beam.

Incidentally, it is to be noted that in FIG. 2, for the purpose of the easier understanding of the present invention, there is shown an arrangement in which the respective pairs of delay lines 1001a,..., 1001m, , and 1001n and selection switches 1002a,...., 1002m, ..., and 1002n, the number of which pairs is equal to that of the ultrasonic transducers, are provided and further the adder 1003 for adding the received signals together, which are outputted from the delay lines 1001a, ..., 1001m, ..., and 1001n, is provided. Indeed, however, a plurality of received signals, which are obtained in a plurality of ultrasonic transducers, are inputted into a single delay line having a number of taps, while the taps to which the received signals are applied, respectively, are controlled, so that the plurality of received signals are delayed by the times associated taps, respectively, and then added to each other in the delay line on a current basis. In this manner, a scanning line signal, which is subjected to a delay according to the controlled delay pattern and also an addition, or a so-called beamformation, is directly outputted from the single delay line.

Figure 3:
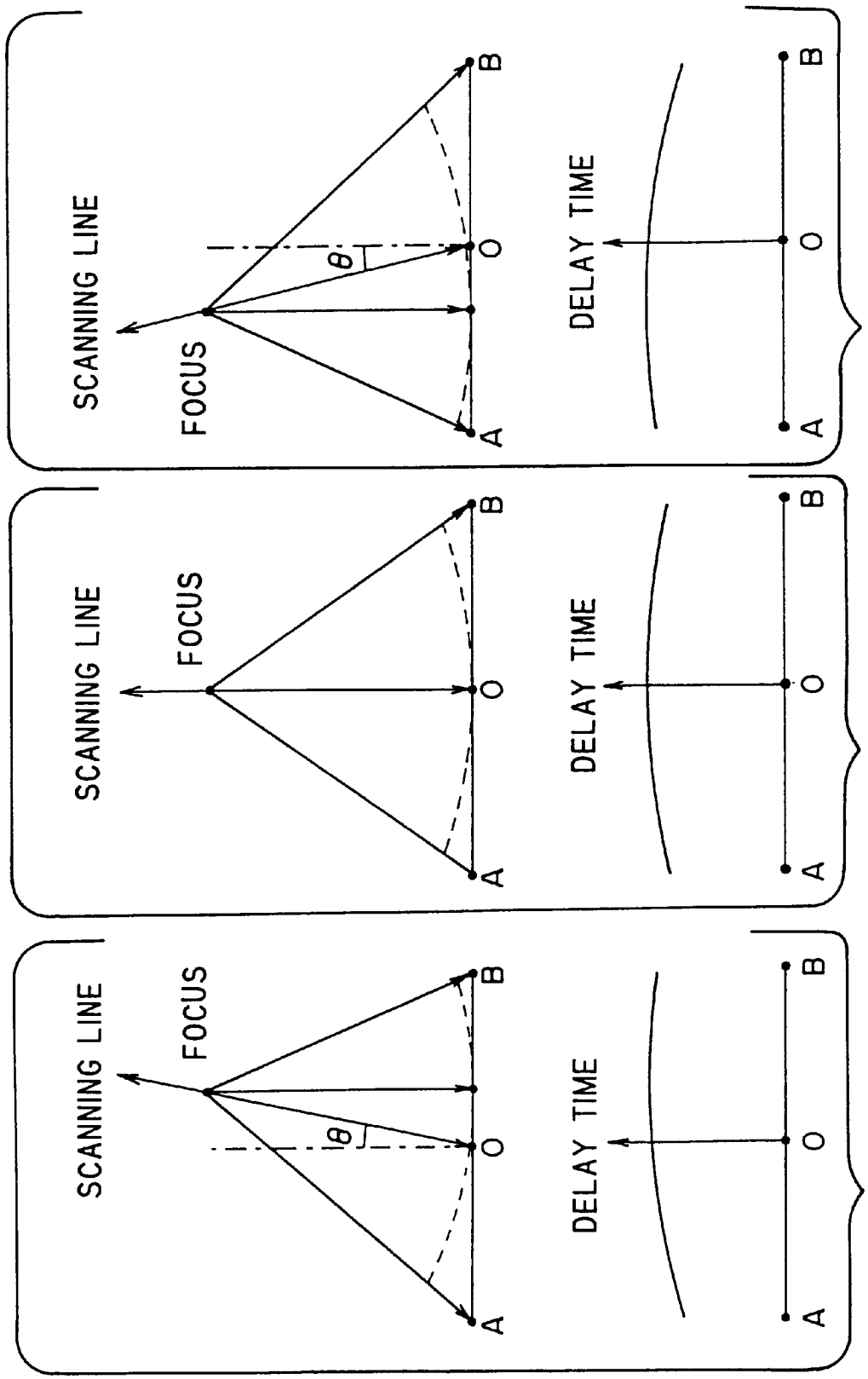
FIGS. 3(A), 3(B) and 3(C) are explanatory views each showing a relationship between a delay pattern and a direction of a scanning line.

FIGS. 3(A), 3(B) and 3(C) are explanatory views each showing a relationship between a delay pattern and a direction of a scanning line.

In each of FIGS. 3(A), 3(B) and 3(C), it is assumed that a plurality of ultrasonic transducers are arranged between points A and B, and an intermediate point between the points A and B is denoted by a point 0. At that time, with respect to received signals derived through the respective ultrasonic transducers, as shown in FIG. 3(A), when rather longer delay time is given for received signals derived through the ultrasonic transducers located at the point B side, there will be formed a reception scanning line slanting to the point B side with the intermediate point 0 as the starting point. As shown in FIG. 3(B), when a symmetrical delay time pattern is given with respect to the intermediate point 0, there will be formed a reception scanning line extending perpendicularly to an arrangement direction of the ultrasonic transducers with the intermediate point 0 as the starting point. As shown in FIG. 3(C), when rather longer delay time is given for received signals derived through the ultrasonic transducers located at the point A side, there will be formed a reception scanning line slanting to the point A side with the intermediate point 0 as the starting point. Further, even if the same reception scanning line is concerned, it is possible to determine the focus point in accordance with a delay time pattern. Specifically, as shown in each of FIGS. 3(A), 3(B) and 6(C) with a broken line, let us consider such a situation that a circle arc, which is in contact with a segment coupling between the points A and B, is drawn with the focus as the central part. Ultrasonic waves reflected on the focus and directed to the respective points A, O and B simultaneously reach the intersections of the circle arc and the respective segments coupling the points A, O and B with the focus. This brings about a difference in time wherein ultrasonic waves reflected on the focus are received by the respective ultrasonic transducers. In view of this, received signals obtained through the ultrasonic transducers which the ultrasonic waves reflected on the focus arrive at earlier are delayed by a time until the ultrasonic waves arrive at the ultrasonic transducers which the ultrasonic waves reflected on the focus arrive at later, and then those ultrasonic waves are added together. In this manner, it is possible to form a reception ultrasonic beam extending in a direction along the scanning line passing through the focus and having the narrowest beam diameter at the focus point.

It is to be noted that the plurality of ultrasonic transducers used for the reception of the reflection ultrasonic waves, which are arranged between the points A and B, are, for example, part of the plurality of ultrasonic transducers 21 arranged in the ultrasonic probe 20 (cf. FIG. 1), and a movement of a reception aperture, which consists of the plurality of ultrasonic transducers for use in a reception of the reflection ultrasonic waves, in an arrangement direction of the ultrasonic transducers 21 arranged in the ultrasonic probe 20, makes it possible to alter the origin on the ultrasonic transducers 21 arranged, of the reception scanning line.

In this manner, it is possible to obtain a reception ultrasonic beam travelling along a reception scanning line extending in an arbitrary direction within the subject taking as a starting point an arbitrary point on the ultrasonic transducers 21 arranged on the ultrasonic probe 20, and having a focus on an arbitrary point on the reception scanning line.

Also with respect to the formation of the transmission ultrasonic beam, it is similar to that of the above-mentioned reception ultrasonic beam. That is, high voltage pulses each to be applied to the associated one of the ultrasonic transducers for a transmission of ultrasonic waves are relatively delayed in accordance with a predetermined delay pattern, and then applied to the associated one of the ultrasonic transducers. In this manner, it is possible to obtain a transmission ultrasonic beam travelling along a transmission scanning line extending in an arbitrary direction within the subject taking as a starting point an arbitrary point on the ultrasonic transducers arranged on the ultrasonic probe 20, and having a focus on an arbitrary point on the transmission scanning line.

Figure 4:
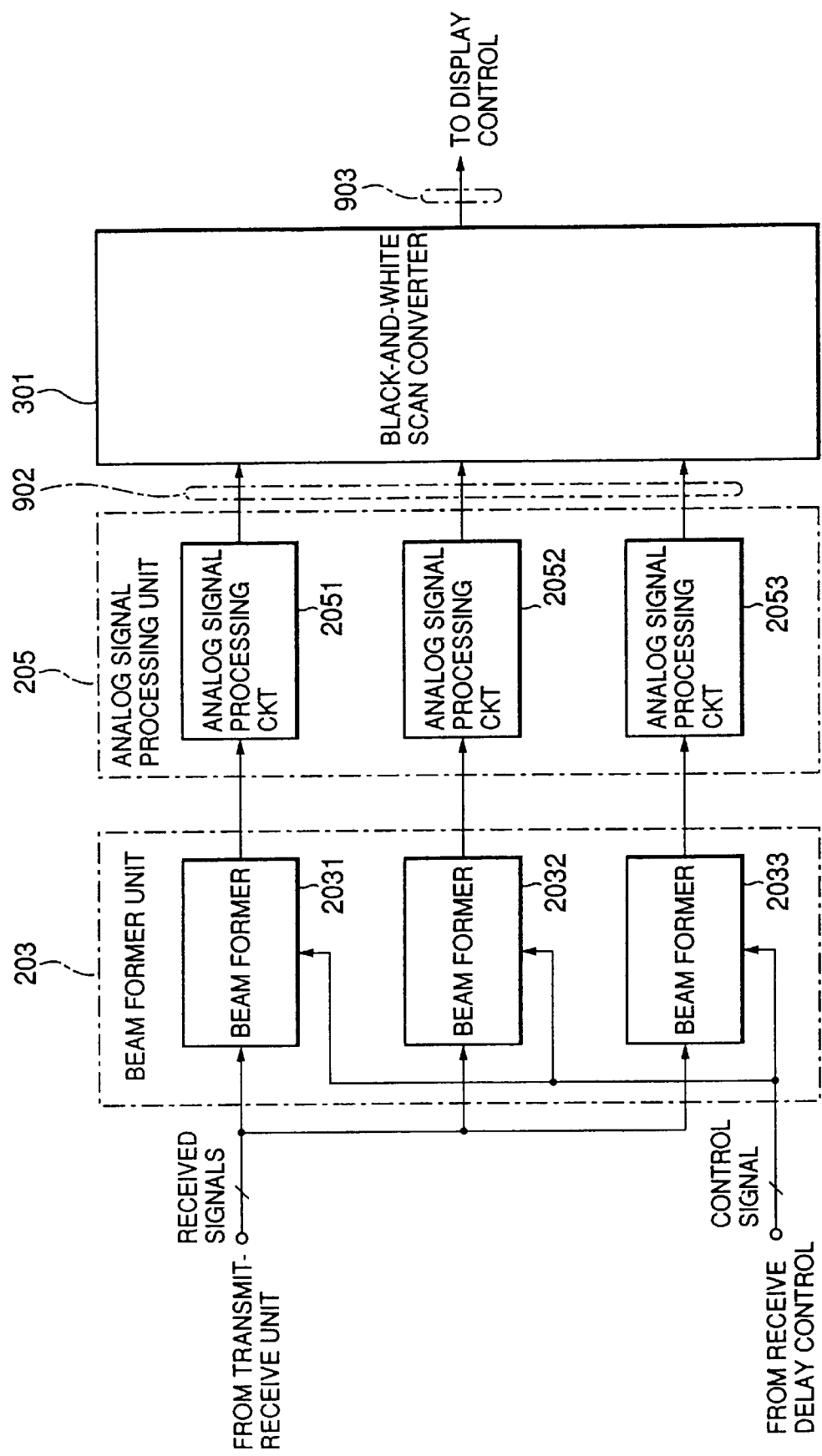
FIG. 4 is a block diagram showing an internal structure of the beamformer unit and the analog signal processing unit each shown in FIG. 1 with a block.

FIG. 4 is a block diagram showing an internal structure of the beamformer unit and the analog signal processing unit each shown in FIG. 1 with a block. Here, referring to FIGS. 1 and 4, there will be described a first ultrasonic diagnostic apparatus according to an embodiment of the present invention.

According to the present embodiment, the beamformer unit 203 comprises three beamformers 2031, 2032 and 2033. Each of the beamformers has the same function as that of the structure shown in FIG. 2, and generates a scanning line signal representative of a reception ultrasonic beam travelling along a reception scanning line extending in an independent direction within the subject taking as a starting point a point independent for each beamformer on the ultrasonic transducers 21 arranged on the ultrasonic probe 20. The scanning line signals generated by the beamformers 2031, 2032 and 2033 are fed to the analog signal processing unit 205. The analog signal processing unit 205 comprises three analog signal processing circuits 2051, 2052 and 2053, which are associated with the three beamformers 2031, 2032 and 2033, respectively. Each of the analog signal processing circuits has such a function that the scanning line signal outputted from the associated beamformer is subjected to a logarithmic compression, a detection, a filtering processing, and a conversion into a digital image data. Outputs of the analog signal processing circuits are fed via the echo bus 902 to the black-and-white scan converter 301. The black-and-white scan converter 301 performs an average operation for three image data obtained through the three analog signal processing circuits 2051, 2052 and 2053 in such a manner that the mean value of pixel values of the associated pixels of three images represented by those three image data is given as the new pixel value, and then converts image data subjected to such an average operation into a video signal for use in display representative of a B-mode image. The video signal thus obtained is transferred via the video bus 903 to the display control unit 500. In the display control unit 500, as mentioned above, an editing processing is performed, if necessary. And the B-mode image subjected to the average operation is displayed on the observation TV monitor. Incidentally, in the example shown in FIG. 4, it is to be noted that the functional combination of the analog signal processing unit 205, the black-and-white scan converter 301 and the display control unit 500 shown in FIG. 1 corresponds to the output image generating unit.

Figure 5:
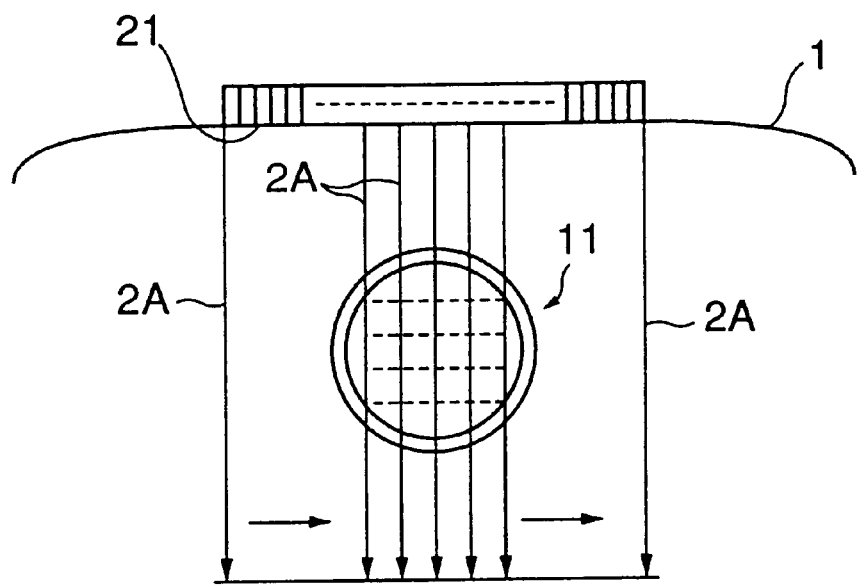
FIG. 5 is a view showing reception scanning lines each extending in a vertical direction with respect to an array of ultrasonic transducers and moving in a horizontal direction with respect to the figure.
Figure 6:
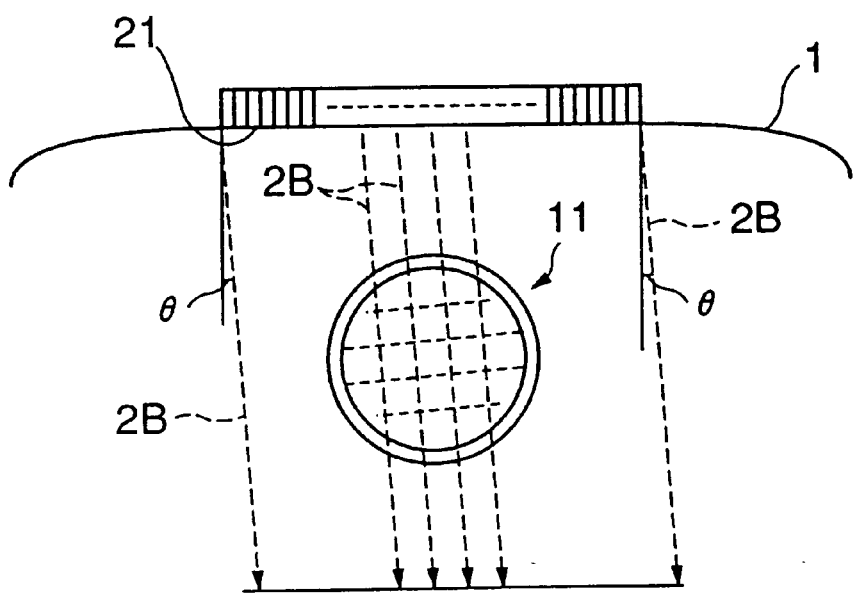
FIG. 6 is a view showing reception scanning lines each slanting to the right as to the vertical direction with respect to an array of ultrasonic transducers.
Figure 7:
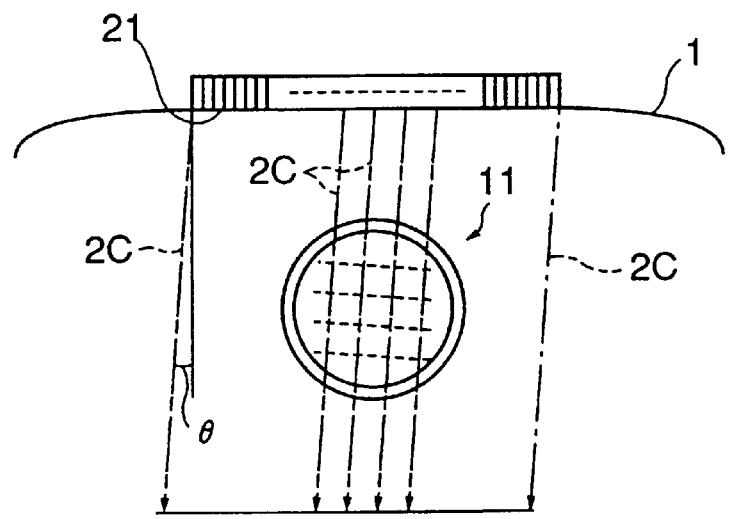
FIG. 7 is a view showing reception scanning lines each slanting to the left as to the vertical direction with respect to an array of ultrasonic transducers.

FIGS. 5–7 show reception scanning lines associated with the reception ultrasonic beams formed by the three beamformers shown in FIG. 4, respectively.

FIG. 5 is a view showing reception scanning lines 2A each extending in a vertical direction with respect to an array of ultrasonic transducers 21 and moving in a horizontal direction with respect to the figure. Of the beamformers 2031, 2032 and 2033, the beamformer 2031 forms the reception scanning line 2A as shown in FIG. 5.

FIG. 6 is a view showing reception scanning lines 2B each slanting by the angle θ to the right as to the vertical direction with respect to an array of ultrasonic transducers 21. Of the beamformers 2031, 2032 and 2033, the beamformer 2032 forms the reception scanning line 2B slanting to the right as shown in FIG. 6.

FIG. 7 is a view showing reception scanning lines 2C each slanting by the angle θ to the left as to the vertical direction with respect to an array of ultrasonic transducers 21. Of the beamformers 2031, 2032 and 2033, the beamformer 2033 forms the reception scanning line 2C slanting to the left as shown in FIG. 7.

With respect to the reception scanning lines 2A, 2B and 20 shown in FIGS. 5–7, the scanning line signals are simultaneously generated on the three reception scanning lines 2A, 2B and 2C extending within a transmission ultrasonic beam formed in an ultrasonic transmission and reception by once, and the operation is repeatedly performed while the scanning line signals move along the array of ultrasonic transducers 21. In this manner, signals associated with three sheets of images shown in FIGS. 5–7 are generated. While it happens that false echo images appear on any of those three images, false echo images caused by the same reflection point within the subject appear on mutually different pixels of the images.

Figure 8:
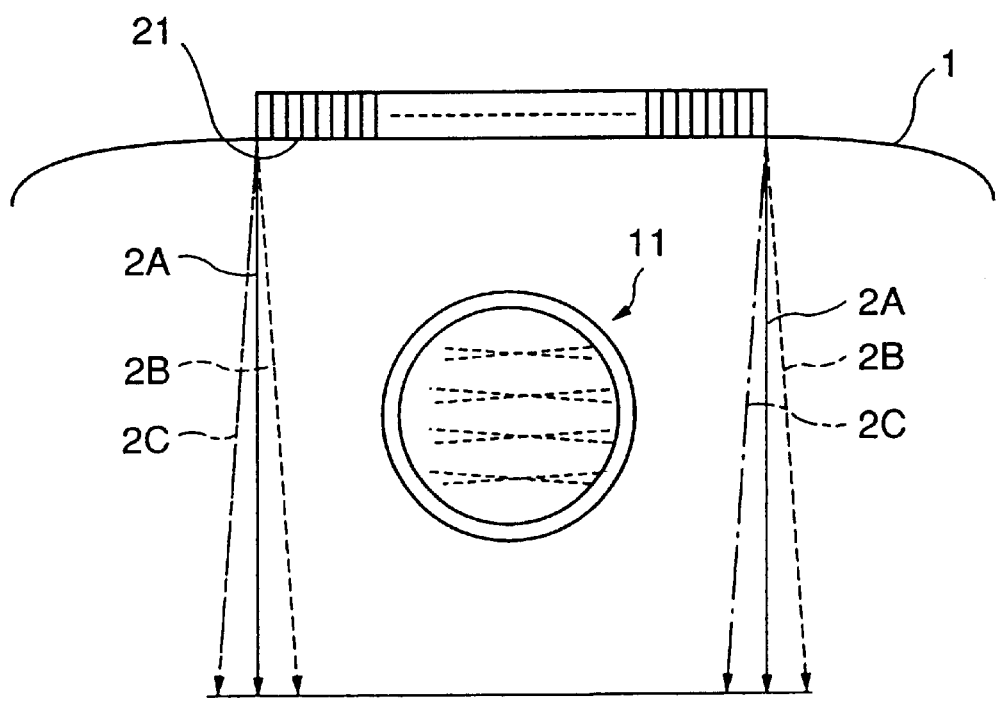
FIG. 8 is a view showing a combination of the images of FIGS. 5 to 7 in which the associated pixels are superimposed on one another to form a field of image.

FIG. 8 is a view showing a combination of the images of FIGS. 5 to 7 in which the associated pixels are superimposed on one another to form a field of image.

Such a superimposing of images causes proper images to be enhanced and false echo images to be relatively weakened since the false echo images appear at mutually different locations on those three sheets of images, thereby producing a high picture quality of B-mode image in which the false echo images are inconspicuous.

Figure 9:
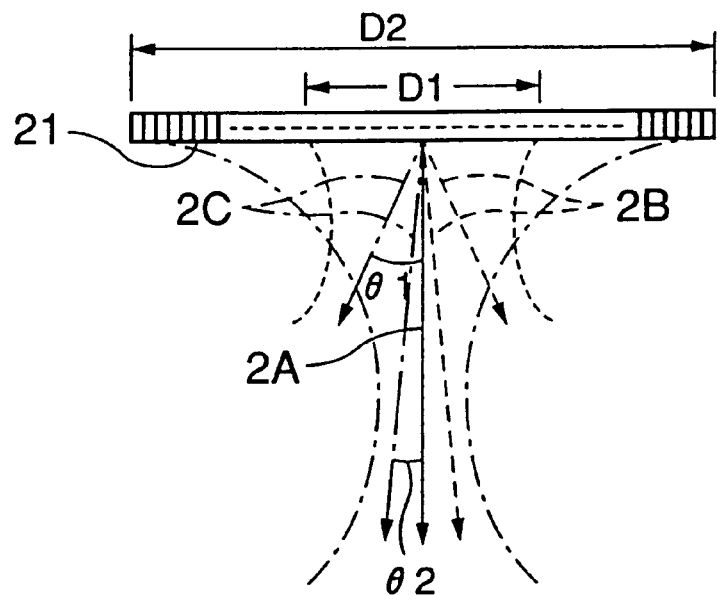
FIG. 9 is a view showing a relationship among the number of ultrasonic transducers required for the formation of a transmission ultrasonic beam, a beam diameter of the transmission ultrasonic beam and an angle among three reception scanning lines generated once.

FIG. 9 is a view showing a relationship among the number of ultrasonic transducers required for the formation of a transmission ultrasonic beam, a beam diameter of the transmission ultrasonic beam and an angle among three reception scanning lines generated once.

In order to form a transmission ultrasonic beam, when a few ultrasonic transducers inside the transmission aperture D1 is driven, there will be formed a transmission ultrasonic beam which is wide in a beam diameter, as shown with a broken line in FIG. 9. At that time, a focus of the transmission ultrasonic beam, which involves the narrowest beam diameter, is usually formed at the shallow site within the subject. The use of the narrow transmission aperture brings about a small power of ultrasonic wave to be transmitted and only permits an observation of a shallow area which is essentially large in a reception level. In this case, it is possible to form in the transmission ultrasonic beam three reception scanning lines with a relatively large angle θ1 among those reception scanning lines.

On the other hand, in order to form a transmission ultrasonic beam, when a large number of ultrasonic transducers inside the transmission aperture D2 is driven, there will be formed a transmission ultrasonic beam which has usually a focus at the deep site within the subject and has a fine beam diameter near the focus, as shown with a dashed line in FIG. 9. In this case, it is possible to form in the transmission ultrasonic beam three reception scanning lines with a relatively small angle among those reception scanning lines.

In order to distribute false echo images on the superimposed image so as to be inconspicuous, it is more advantageous that the angle between reception scanning line-to-line is larger. Thus, ultrasonic scanning lines, which define a large angle therebetween as much as possible, are formed in a transmission ultrasonic beam in accordance with the number of ultrasonic transducers (width of the transmission aperture) concerned in the formation of the transmission ultrasonic beam. In this manner, it is possible to obtain an image in which false echo images are most effectively reduced.

An operation of the handler 7011 shown in FIG. 1 may vary a width of the transmission aperture. In case of forming transmission ultrasonic beams which are the same as one another in the transmission scanning line and the depth of the focus, it is more advantageous in resolution that the beam diameter of the transmission ultrasonic beam is narrowed down as much as possible. In order to form the transmission ultrasonic beam in which the beam diameter is narrowed, the transmission aperture is spread. However, as mentioned above, when the beam diameter is narrowed, the angle between reception scanning line-to-line is reduced. This is in advantageous in the point that an image, in which the false echo images are hard to be conspicuous, is obtained. The conspicuous way of the false echo images is greatly different in accordance with the subject. Thus, the use of the handler 7011 makes it possible to provide such a control that an image, in which an inconspicuousness of false echo images balances with a resolution of the image, is obtained in accordance with the subject.

Figure 10:
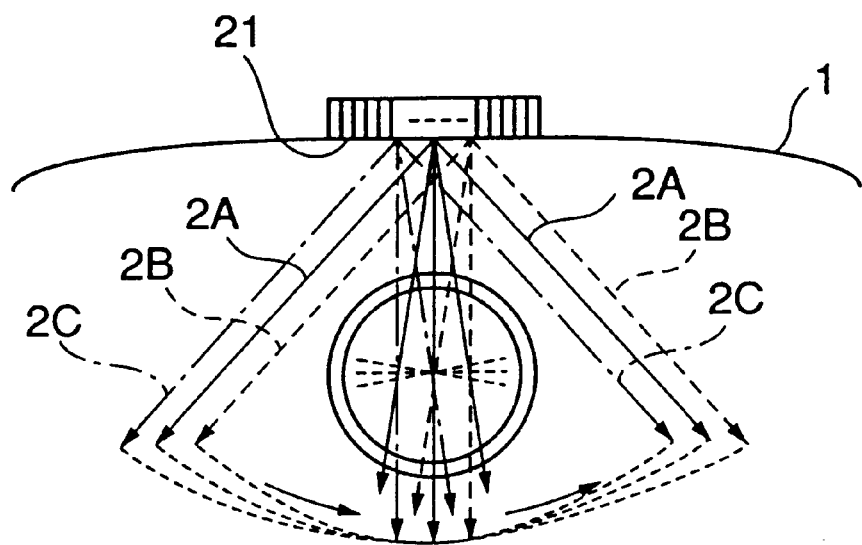
FIG. 10 is a diagram used for the explanation of a method of the formation of the reception scanning lines at the time of the sector scanning.

FIG. 10 is a diagram used for the explanation of a method of the formation of the reception scanning lines at the time of the sector scanning.

The sector scanning typically means a method of scanning in which a certain fixed point is selected, as a starting point, on an array of ultrasonic transducers 21, and scanning lines extending from the selected starting point into the subject are sequentially altered in a direction so that a sector is formed as a whole.

At that time, the reception scanning lines are scanned in such a manner that three reception scanning lines extending into the subject with mutually different points on the ultrasonic transducers 21 as the respective starting points make up a set, and those three reception scanning lines are scanned as a sector while they are kept on being parallel to one another. Specifically, whenever a transmission ultrasonic beam is formed, there are formed three reception scanning lines 2A, 2B and 2C extending within the transmission ultrasonic beam on a parallel basis. In this manner, three images obtained by means of scanning three reception scanning lines as a sector are synthesized into a sheet of image in such a manner that the associated pixels are superimposed on one another. Thus, in a similar fashion to that of the above-mentioned linear scanning, it is possible to obtain an image in which false echo images are Inconspicuous.

Figure 11:
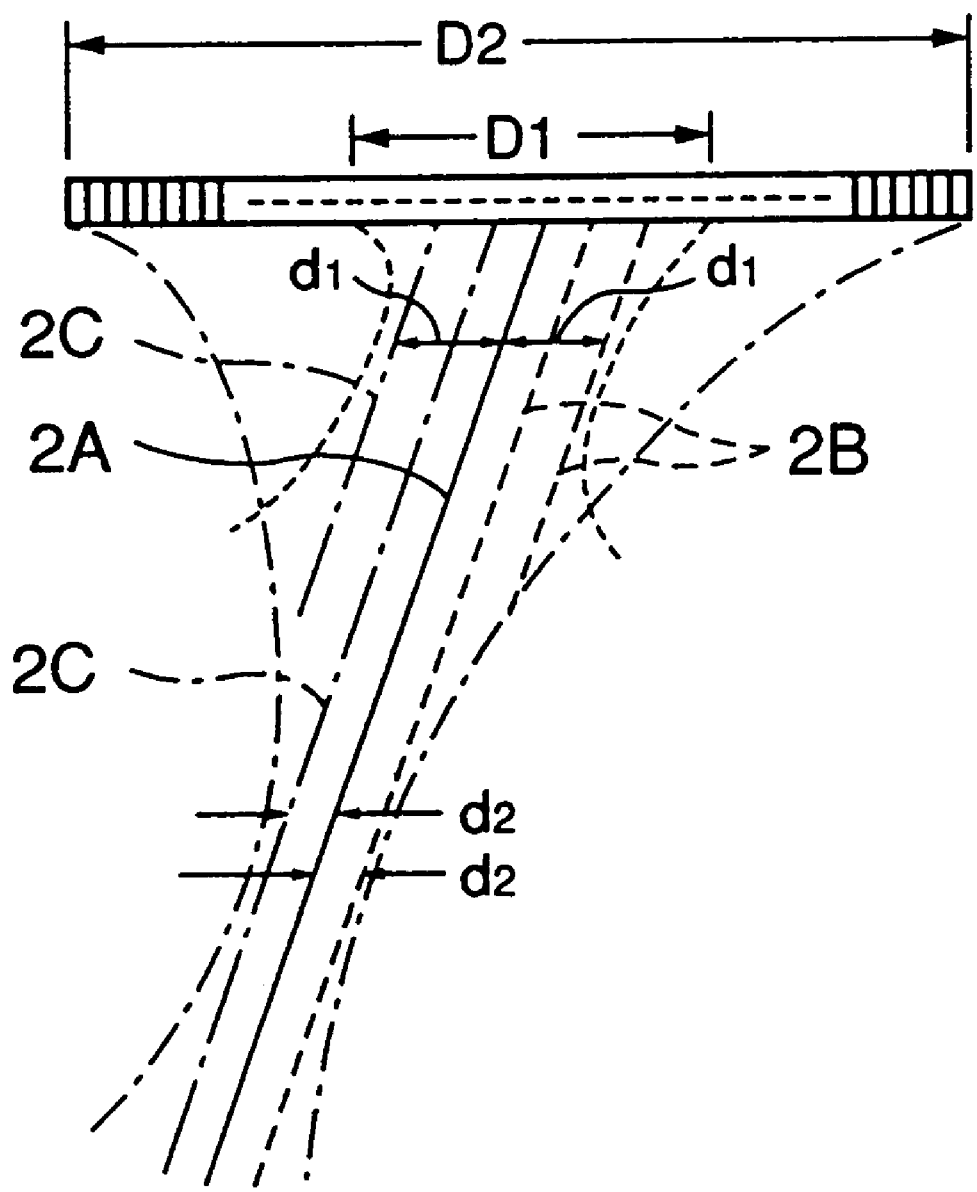
FIG. 11 is a view showing a relationship among the extent of a transmission aperture, a beam diameter of the transmission ultrasonic beam and an angle among three reception scanning lines generated once.

FIG. 11 is a view showing a relationship among the extent of a transmission aperture, a beam diameter of the transmission ultrasonic beam and an angle among three reception scanning lines generated once.

As described referring to FIG. 9, when the narrow transmission aperture D1 is used, the transmission ultrasonic beam having a wide beam diameter is formed. At that time, there are formed reception scanning lines having wide intervals d1 therebetween. On the other hand, also as described referring to FIG. 9, when the wide transmission aperture D2 is used, the transmission ultrasonic beam having a narrow beam diameter is formed. At that time, there are formed reception scanning lines having narrow intervals d2 therebetween.

In order that false echo images is hard to be conspicuous on the combined image, it is more advantageous that the reception scanning lines having wide intervals therebetween are formed. Thus, the intervals between the reception scanning lines are expanded as much as possible in accordance with a width of the transmission aperture. This feature makes it possible to obtain an image in which false echo images are most effectively reduced.

Also in the sector scanning, an operation of the handler 7011 shown in FIG. 1 may vary a width of the transmission aperture, so that the beam diameter of the transmission ultrasonic beam is varied, whereby the intervals between reception scanning lines are varied. Thus, the use of the handler 7011 makes it possible to provide such a control that an image, in which an inconspicuousness of false echo images balances with a resolution of the image, is obtained in accordance with the subject.

Incidentally, according to the present embodiment as mentioned above, there is provided such an explanation that when a plurality of images are combined, assuming that the pixel values of the associated pixels of three images are expressed by $x_1$, $x_2$ and $x_3$, the three images are combined through an arithmetic mean operation by $x=(x_1+x_2+x_3)/3$ to form a frame of image. It is acceptable, however, that instead of such an arithmetic mean operation, a geometric mean operation by $x=\sqrt[3]{(x_1 \cdot x_2 \cdot x_3)}$, or a square mean operation by $x=\sqrt{\{(x_1^2+x_2^2+x_3^2)/3\}}$ may be adopted.

Further, according to the present embodiment as mentioned above, three scanning signals obtained through three beamformers 2031, 2032 and 2033 shown in FIG. 4 are detected by three analog signal processing circuits 2051, 2052 and 2053, respectively, and then converted into digital signals, and thereafter an operation for combining those three images is performed. It is acceptable, however, that the analog signal processing unit 205 performs a combining processing with an analog operation in the state of the analog signals after the detection, or alternatively in the state of the scanning line signals including carrier components before the detection outputted from the beamformers 2031, 2032 and 2033.

Furthermore, according to the present embodiment as mentioned above, while three frames of images are combined or superimposed on one another, the number of frames of images to be combined is not restricted to three. It is acceptable that an apparatus is so arranged to combine two or more than four frames of images taking into account the cost, the circuit scale, the operating speed and the like, in addition to the inconspicuousness of false echo images.

Figure 12:
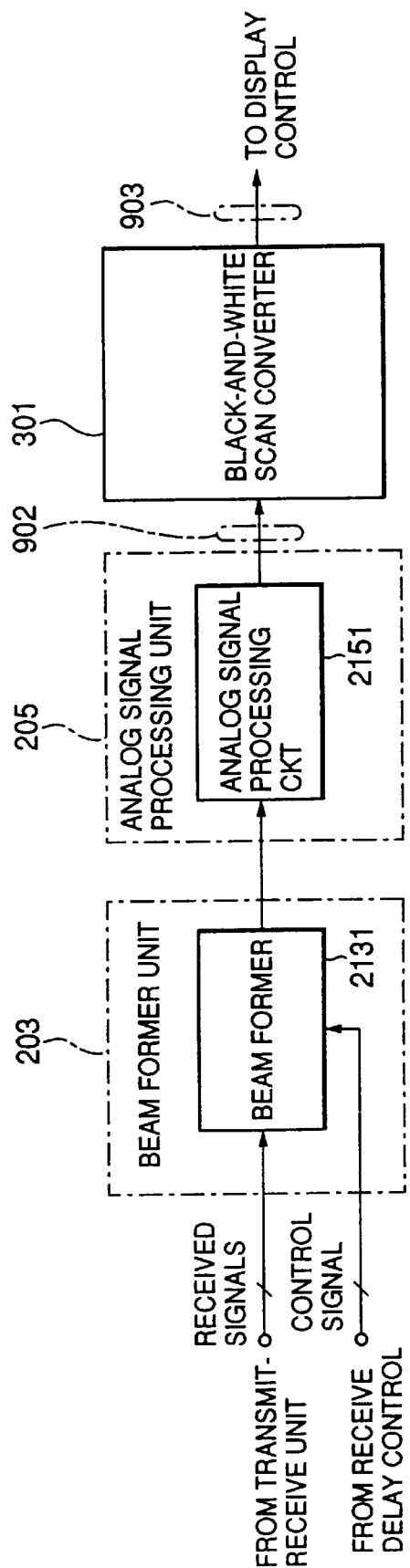
FIG. 12 is a block diagram showing an internal structure of the beamformer unit and the analog signal processing unit in the second ultrasonic diagnostic apparatus according to an embodiment of the present invention.
Figure 13:
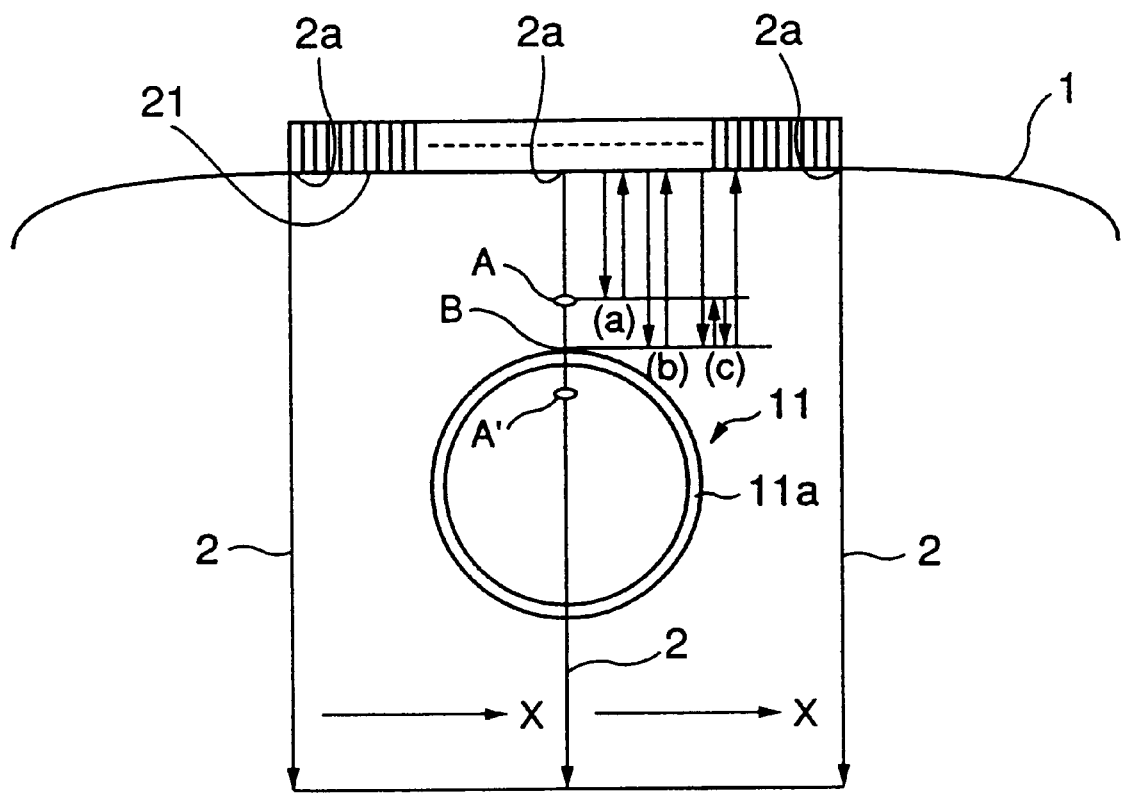
FIG. 13 is a diagram used for the explanation of the function of an ultrasonic diagnostic apparatus.

FIG. 12 is a block diagram showing an internal structure of the beamformer unit and the analog signal processing unit in the second ultrasonic diagnostic apparatus according to an embodiment of the present invention. The block diagram shown in FIG. 12 corresponds to that of FIG. 4 related to the embodiment of the first ultrasonic diagnostic apparatus according to the present invention.

According to the embodiment shown in FIG. 12, the beamformer unit 203 has a single beamformer 2131. The beamformer 2131 generates in accordance with the receive delay control unit 202 (cf. FIG. 1) a scanning line signal representative of a reception ultrasonic beam along the reception scanning line extending in an arbitrary direction within the subject with an arbitrary point on the ultrasonic transducers 21 as a starting point.

The beamformer 2131 forms, for example, in a certain frame, as shown in FIG. 5, the reception scanning lines 2A which are vertical with respect to an array of ultrasonic transducers 21 and move in parallel with respect to the left and right of the figure; in the subsequent frame, as shown in FIG. 6, the reception scanning lines 2B which slant to the right by the angle θ with respect to a direction vertical to an array of ultrasonic transducers 21; in the further subsequent frame, as shown in FIG. 7, the reception scanning lines 20 which slant to the left by the angle with respect to a direction vertical to an array of ultrasonic transducers 21; and in the furthermore subsequent frame, returning to FIG. 5, the reception scanning lines 2A. In this manner, different reception scanning lines are circularly formed for each frame. It is to be noted that of a large number of reception scanning lines 2A, 2B and 2C shown in FIG. 5, FIG. 6 and FIG. 7, three reception scanning lines 2A, 2B and 2C associated with a certain transmission scanning line exist inside a transmission ultrasonic beam along the transmission scanning line.

In this manner, the beamformer 2131 shown in FIG. 12 performs the parts of three beamformers 2031, 2032 and 2033 shown in FIG. 4 for each frame on a sequentially circulating basis.

The scanning line signal derived from the beamformer 2131 is fed to the analog signal processing unit 205. According to the embodiment shown in FIG. 12, the analog signal processing unit 205 is also provided with a single analog signal processing circuit 2151 in compliance with the fact that the beamformer unit 203 is provided with a single beamformer 2131. In the analog signal processing circuit 2151, the scanning line signal outputted from the beamformer 2131 is subjected to a logarithmic compression process and then a filtering processing, and is further converted into digital image data. The digital image data thus converted is fed via the echo bus 902 to the black-and-white scan converter 301. The black-and-white scan converter 301 converts sequentially images for each frame into video signals for display representative of a B-mode image, without performing an average operation for a plurality of frames of images as the black-and-white scan converter in the embodiment shown in FIG. 4, and transmits the video signals thus converted via video bus to the display control unit 500 in which the B-mode image is displayed on the observation TV monitor 707. The B-mode image to be displayed is an image in which an image by the reception scanning line 2A shown in FIG. 5, an image by the reception scanning line 2B shown in FIG. 6, and an image by the reception scanning line 20 shown in FIG. 7 are circulatingly repeated in turn. According to this scheme, a proper image is always displayed and thus emphasized, on the other hand, false echo images appear at mutually different sites on three frames of images and thus be relatively weakened through an averaging by the after-image effect due to the image display characteristic of the observation TV monitor 707 and by the after-image effect due to the human's eyes. Thus, it is possible to produce a high picture quality of B-mode image in which false echo images are inconspicuous.

While there has been explained the embodiment of the second ultrasonic diagnostic apparatus referring to a method of forming a reception scanning line at the time of the linear scanning by way of example, this is the similar as to the matter of the sector scanning. In case of the sector scanning, there are formed, in a certain frame, as shown in FIG. 10, the reception scanning lines 2A; in the subsequent frame, the reception scanning lines 2B which are different from the reception scanning lines 2A in the starting point on an array of ultrasonic transducers 21; in the further subsequent frame, the reception scanning lines 2C which are further different from the reception scanning lines 2A and 2B in the starting point on an array of ultrasonic transducers 21; and in the furthermore subsequent frame, the reception scanning lines 2A. In this manner, different reception scanning lines 2A, 2B and 20 are circularly formed for each frame. It is to be noted that the associated reception scanning lines 2A, 2B and 2C exist inside a transmission ultrasonic beam along a reception scanning line.

Circulatingly displayed on the observation TV monitor 707 are an image by the reception scanning line 2A, an image by the reception scanning line 2B, and an image by the reception scanning line 2C. According to this scheme, false echo images are relatively weakened by the after-image effect due to the image display characteristic of the observation TV monitor 707 and the after-image effect due to the human's eyes. Thus, it is possible to produce a high picture quality of B-mode image in which false echo images are inconspicuous.

Incidentally, in the above-mentioned embodiment, there has been explained an example wherein three frames of images, which are different in positions and directions of the reception scanning lines, are circulatingly produced and sequentially displayed. But it is to be noted that the images to be circulatingly produced are not restricted to be of three frames, and it is acceptable that the positions and the directions of the reception scanning lines are determined so as to circulate with four frames or more frames, or alternatively it is acceptable that two frames of images, which are mutually different in positions and directions of the reception scanning lines, are alternately produced and displayed.

As mentioned above, according to the present invention, it is possible to implement an ultrasonic diagnostic apparatus capable of obtaining a high picture quality of image in which false echo images caused by a multiple reflection or a multiple echo are inconspicuous.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. An ultrasonic diagnostic apparatus comprising:

an ultrasonic probe having an array having a plurality of ultrasonic transducers to transmit ultrasonic waves into a subject upon placing the array on the subject and to receive ultrasonic waves reflected within the subject and returned;

a transmit-receive unit to drive the ultrasonic transducers so as to sequentially form transmission ultrasonic beams traveling along a plurality of transmission scanning lines extending into the subject with an origin on the ultrasonic transducers as a single starting point, and to receive the ultrasonic transducers ultrasonic waves reflected within the subject and returned to produce received signals associated with the ultrasonic transducers;

a beamformer unit having a plurality of beamformers each to relatively delay a plurality of received signals associated with a plurality of ultrasonic transducers, respectively, produced in said transmit-receive unit, and adding the received signals thus delayed to each other, each of said plurality of beamformers producing a plurality of scanning line signals representative of a plurality of reception ultrasonic beams along a plurality of reception scanning lines extending within a transmission ultrasonic beam traveling along a transmission scanning line with an origin on the ultrasonic transducers as a single starting point;

an output image generating unit to generate an output image signal representative of an output image in which a plurality of images are combined in accordance with the scanning line signals produced in said beamformer unit while said transmit-receive unit forms the transmission ultrasonic beams traveling along said plurality of transmission scanning lines; and an image output unit to output an output image based on the output image signal generated in said output image generating unit.

2. An ultrasonic diagnostic apparatus according to claim 1, wherein said transmit-receive unit drives a plurality of ultrasonic transducers arranged on said ultrasonic probe so as to sequentially form transmission ultrasonic beams each traveling along an associated one of the plurality of transmission scanning lines in which their origins sequentially shift along said plurality of ultrasonic transducers, and wherein each of said plurality of beamformers produces a plurality of scanning line signals representative of a plurality of reception ultrasonic beams along a plurality of reception scanning lines extending in mutually different directions within a transmission ultrasonic beam traveling along a transmission scanning line.

3. An ultrasonic diagnostic apparatus according to claim 2, wherein said transmit-receive unit permits an optional selection of a number of ultrasonic transducers to be driven for a formation of a transmission ultrasonic beam, and wherein each of said plurality of beamformers produces a plurality of scanning line signals representative of a plurality of reception ultrasonic beams along a plurality of reception scanning lines, according to a number of ultrasonic transducers to be driven by said transmit-receive unit for a formation of a transmission ultrasonic beam traveling along a transmission scanning line, arranged in such a manner that when the number is large, an angle between the reception scanning lines is narrow, and when the number is small, an angle between the reception scanning lines is wide.

4. An ultrasonic diagnostic apparatus according to claim 3, wherein said transmit-receive unit drives ultrasonic transducers, to form a transmission ultrasonic beam traveling along a transmission scanning line, in accordance with a distance between an origin on the ultrasonic transducers of the transmission scanning line and a focus position of the transmission ultrasonic beam in such a manner that when the distance is long, a large number of ultrasonic transducers is driven, and when the distance is short, a small number of pieces of ultrasonic transducers is driven.

5. An ultrasonic diagnostic apparatus according to claim 3, further comprising a handler for instructing directly or indirectly a number of ultrasonic transducers to be driven to form a transmission ultrasonic beam.

6. An ultrasonic diagnostic apparatus according to claim 1, wherein said transmit-receive unit drives the ultrasonic transducers so as to sequentially form transmission ultrasonic beams each traveling along an associated one of transmission scanning lines in which their scanning directions sequentially change, and wherein each of said plurality of beamformers produces a plurality of scanning line signals representative of a plurality of reception ultrasonic beams along a plurality of reception scanning lines extending within a transmission ultrasonic beam traveling along a transmission scanning line with mutually different origins on the ultrasonic transducers as starting points.

7. An ultrasonic diagnostic apparatus according to claim 6, wherein said transmit-receive unit permits an optional selection of a number of ultrasonic transducers to be driven to form a transmission ultrasonic beam, and wherein each of said plurality of beamformers produces a plurality of scanning line signals representative of a plurality of reception ultrasonic beams along a plurality of reception scanning lines, according to a number of ultrasonic transducers driven by said transmit-receive unit to form a transmission ultrasonic beam traveling along a transmission scanning line, having mutually different origins, arranged in such a manner that when the number is large, a distance between the origins is short, and when the number is small, a distance between the origins is long.

8. An ultrasonic diagnostic apparatus according to claim 7, wherein said transmit-receive unit drives ultrasonic transducers, to form a transmission ultrasonic beam traveling along a transmission scanning line, in accordance with a distance between an origin on the ultrasonic transducers of the transmission scanning line and a focus position of the transmission ultrasonic beam in such a manner that when the distance is long, a large number of ultrasonic transducers is driven, and when the distance is short, a small number of ultrasonic transducers is driven.

9. An ultrasonic diagnostic apparatus according to claim 7, further comprising a handler for instructing directly or indirectly a number of ultrasonic transducers to be driven to form a transmission ultrasonic beam.

10. An ultrasonic diagnostic apparatus according to claim 1, wherein said output image generating unit performs an arithmetic mean operation, a geometric mean operation or a square mean operation for pixel values of associated pixels of the plurality of images to generate the output image signal representative of the output image.

11. An ultrasonic diagnostic apparatus comprising:

an ultrasonic probe having an array having a plurality of ultrasonic transducers to transmit ultrasonic waves into a subject upon placing the array on the subject and to receive ultrasonic waves reflected within the subject and returned;

a transmit-receive unit to drive the ultrasonic transducers so as to sequentially form transmission ultrasonic beams traveling along a plurality of transmission scanning lines extending into the subject with an origin on the ultrasonic transducers as a starting point, and to receive the ultrasonic transducers ultrasonic waves reflected within the subject and returned to produce received signals associated with the ultrasonic transducers;

a beamformer unit having a beamformer to relatively delay a plurality of received signals associated with a plurality of ultrasonic transducers, respectively, produced in said transmit-receive unit, and adding the received signals thus delayed to each other, said beamformer producing a scanning line signal representative of a reception ultrasonic beam along a reception scanning line extending within a transmission ultrasonic beam traveling along a transmission scanning line with an origin on the ultrasonic transducers as a starting point;

an output image generating unit to generate an output image signal representative of an output image in accordance with the scanning line signals produced in said beamformer unit while said transmit-receive unit forms the transmission ultrasonic beams traveling along said plurality of transmission scanning lines; and an image output unit to output an output image based on the output image signal generated in said output image generating unit, wherein said beamformer unit produces scanning line signals each representative of a reception ultrasonic beam along a reception scanning alternating or circulating different on a sequentially changed frame, the reception scanning line extending within a transmission ultrasonic beam traveling along a same transmission scanning line in the sequentially changed frame, where a process of going once through a formation of the plurality of transmission ultrasonic beams traveling alone the plurality transmission scanning lines is expressed by one frame.

12. An ultrasonic diagnostic apparatus according to claim 11, wherein said transmit-receive unit drives, in each frame, a plurality of ultrasonic transducers arranged on said ultrasonic probe so as to sequentially form transmission ultrasonic beams each traveling along an associated one of transmission scanning lines in which their origins sequentially shift along said plurality of ultrasonic transducers, and wherein said beamformer produces scanning line signals each representative of a reception ultrasonic beam along a reception scanning line extending in a direction alternating or circulating different on a sequentially changed frame within a transmission ultrasonic beam traveling along a same transmission scanning line in a plurality of frames.

13. An ultrasonic diagnostic apparatus according to claim 11, wherein said transmit-receive unit drives, in each frame, the ultrasonic transducers so as to sequentially form transmission ultrasonic beams each traveling along an associated one of transmission scanning lines in which their scanning directions sequentially change, and wherein said beamformer produces scanning line signals each representative of a reception ultrasonic beam along a reception scanning line extending within a transmission ultrasonic beam traveling along a same transmission scanning line in a plurality of frames with alternating or circulating different origins on a sequentially changed frame on the ultrasonic transducers as starting points.

* * * * *

UNITED STATES PATENT AND TRADEMARK OFFICE
CERTIFICATE OF CORRECTION

PATENT NO.  : 5,908,390
DATED       : June 1, 1999
INVENTOR(S) : Tetsuya MATSUSHIMA It is certified that error appears in the above-identified patent and that said Letters Patent is hereby corrected as shown below:

Cover Page: [30] PRIORITY DATA
   change "Japan 6-125908, filed May 10, 1994" to --Hei 9-200253   Jul. 25, 1997--

Col. 25, line 19, change "alone" to --along--.

Signed and Sealed this

Seventh Day of December, 1999

Q. TODD DICKINSON

Attest:

Attesting Officer

Acting Commissioner of Patents and Trademarks